(12) United States Patent
Lee

(10) Patent No.: US 9,644,793 B2
(45) Date of Patent: May 9, 2017

(54) FLUID CONTROL VALVE ASSEMBLY

(71) Applicant: YOUNGDO IND. CO., LTD., Busan (KR)

(72) Inventor: Kwang Ho Lee, Busan (KR)

(73) Assignee: Youngdo Ind. Co., Ltd., Gangseo-Gu Busan (KR)

( * ) Notice: Subject to any disclaimer, the term of this patent is extended or adjusted under 35 U.S.C. 154(b) by 365 days.

(21) Appl. No.: 14/400,721

(22) PCT Filed: May 20, 2013

(86) PCT No.: PCT/KR2013/004405
§ 371 (c)(1),
(2) Date: Nov. 12, 2014

(87) PCT Pub. No.: WO2013/183871
PCT Pub. Date: Dec. 12, 2013

(65) Prior Publication Data
US 2015/0184805 A1    Jul. 2, 2015

(30) Foreign Application Priority Data

Jun. 4, 2012  (KR) .................. 10-2012-0059897
Jun. 4, 2012  (KR) .................. 10-2012-0059899

(51) Int. Cl.
*F17C 13/04*     (2006.01)
*H01M 8/04089*   (2016.01)

(52) U.S. Cl.
CPC ...... *F17C 13/04* (2013.01); *F17C 2201/0109* (2013.01); *F17C 2201/056* (2013.01);
(Continued)

(58) Field of Classification Search
CPC .............. F17C 13/04; F17C 2205/0332; F17C 2205/0326; F17C 2205/0335;
(Continued)

(56) References Cited

U.S. PATENT DOCUMENTS 5,232,019 A * 8/1993 Wolff ............... F17C 13/04
                                                137/613
5,309,945 A * 5/1994 Sakai ............... F16K 1/305
                                                137/861
(Continued)

FOREIGN PATENT DOCUMENTS

JP        07-280131       10/1995
KR    1020110012263 A      9/2011

*Primary Examiner* — Craig Schneider
*Assistant Examiner* — Josephine Trinidad-Borges
(74) *Attorney, Agent, or Firm* — Rosenberg, Klein & Lee

(57) ABSTRACT

Provided is a fluid control valve assembly including: a main valve body having a first flow passage that is mounted on an inlet of a high-pressure vessel and through which a charging source gas passes, a second flow passage through which a feeding source gas passes, and a third flow passage to which the first flow passage and the second flow passage are connected; a manual valve that is mounted on the main valve body and that opens and closes the third flow passage; a solenoid valve that is mounted on the main valve body and that opens and closes the second flow passage by an electrical signal; a first check valve that is provided on the first flow passage to thus block a reverse flow of the charging source gas; and a second check valve that is provided on the second flow passage to thus block a reverse flow of the feeding source gas, and block the charging source gas from flowing in the second flow passage, to thereby prevent the charging source gas from flowing in the solenoid valve. Accordingly, a charging gas pressure of a high-pressure is prevented from being applied to a solenoid valve, to thereby prevent damage to the solenoid valve and to prevent a malfunction of the solenoid valve.

20 Claims, 20 Drawing Sheets

(52) U.S. Cl.
CPC .. *F17C 2201/058* (2013.01); *F17C 2205/035* (2013.01); *F17C 2205/0326* (2013.01); *F17C 2205/0329* (2013.01); *F17C 2205/0332* (2013.01); *F17C 2205/0335* (2013.01); *F17C 2205/0341* (2013.01); *F17C 2205/0344* (2013.01); *F17C 2205/0385* (2013.01); *F17C 2205/0394* (2013.01); *F17C 2221/012* (2013.01); *F17C 2223/0123* (2013.01); *F17C 2223/036* (2013.01); *F17C 2250/0439* (2013.01); *F17C 2265/066* (2013.01); *F17C 2270/0178* (2013.01); *F17C 2270/0184* (2013.01); *H01M 8/04089* (2013.01); *Y02E 60/321* (2013.01); *Y10T 137/794* (2015.04); *Y10T 137/877* (2015.04)

(58) Field of Classification Search
CPC ...... F17C 2205/0341; F17C 2205/0329; F17C 2205/0344; F17C 2205/0439; F17C 2205/035; F17C 2205/0385; F17C 2205/0394; F17C 2221/012; F17C 2223/0123; F17C 2223/036; F17C 2265/066; F17C 2270/0178; F17C 2270/0184; F17C 2201/058; F17C 2201/0109; F17C 2201/056; Y02E 60/321; Y10T 137/794; Y10T 137/877; H01M 8/04089

See application file for complete search history.

(56) References Cited

U.S. PATENT DOCUMENTS

| | | | | |
|---|---|---|---|---|
| 5,738,145 | A * | 4/1998 | Daicho | F16K 1/305 137/878 |
| 5,813,429 | A * | 9/1998 | Ohtaka | F17C 5/06 137/266 |
| 6,202,688 | B1 * | 3/2001 | Khadim | F16K 1/305 137/599.08 |
| 7,309,113 | B2 * | 12/2007 | Carter | F16K 31/406 137/505 |
| 7,951,225 | B2 * | 5/2011 | Olander | F17C 11/00 206/0.7 |
| 2005/0103382 | A1 | 5/2005 | Carter | |
| 2011/0114194 | A1 * | 5/2011 | Chen | F17C 13/04 137/14 |

* cited by examiner

FLUID CONTROL VALVE ASSEMBLY

TECHNICAL FIELD

The present invention relates to a fluid control valve assembly for controlling flow of a source gas when the source gas is charged into a high-pressure vessel and or supplied (bra gas consumer such as a gas engine.

BACKGROUND ART

In the case of a hydrogen fuel cell system, a fluid control valve is installed in a high-pressure vessel in which a source gas is stored, and controls flow of the source gas when the source gas is charged into a high-pressure vessel, and also controls flow of the source gas when the source gas stored in the high-pressure vessel is supplied for a gas consumer such as a gas engine.

The fluid control valve can precisely control flow of the source gas according to electrical signals, need to maintain a constant pressure of a fluid stored in a pressure vessel, and need to prevent an explosion of a high-pressure vessel when a hydrogen fuel cell vehicle rolls over or a fire breaks out in a hydrogen fuel cell vehicle.

As disclosed in U.S. Pat. No. 7,309,113 B2 (Dec. 18, 2007), a conventional flow control system for a valve includes: a valve body mounted in a high-pressure cylinder and having a main flow passage connecting a first area at a first pressure to a second area at a second pressure; a filter that is mounted at an inlet side connected to the main flow passage; a manual valve that is mounted at a portion communicating from the main flow passage and that manually opens and closes the main flow passage; a solenoid valve that is mounted on a backpressure passage communicating from the main flow passage and that opens and closes the backpressure passage in accordance with an electrical signal; and a shuttle valve that is mounted on the main flow passage and that closes the main flow passage if an overpressure occurs and opens the main flow passage if a normal pressure is generated.

In such a conventional flow control system (bra valve, a high-pressure charging gas flows into the main flow passage through an inlet of the valve during charging, and passes through the solenoid valve if the solenoid valve operates in a direction where the solenoid valve is open to then flow into the high-pressure cylinder. In addition, when a source gas stored in the high-pressure cylinder is supplied to a gas consumer such as a gas engine, the source gas stored in the high-pressure cylinder passes through the backpressure passage to then be supplied to the gas consumer through the inlet of the valve via the solenoid valve.

However, in the case of the conventional flow control system, since the high-pressure charging gas is directly applied to the solenoid valve, the durability of the solenoid valve may decrease and a malfunction of the solenoid valve may occur. Further, as duration of use of the conventional flow control system becomes longer, the solenoid valve may be damaged.

DISCLOSURE

Technical Problem

To solve the above problems or defects, it is an object of the present invention to provide a fluid control valve assembly in which a charging flow passage for charging a source gas into a high-pressure vessel and a feeding flow passage for supplying a source gas stored in a high-pressure vessel for a gas consumer such as a gas engine are formed separately, and a solenoid valve is mounted on the feeding flow passage, to thus block the charging pressure of the high-pressure from being applied to the solenoid valve, and to thereby prevent damage to the solenoid valve and a malfunction of the solenoid valve.

In addition, it is another object of the present invention to provide a fluid control valve assembly in which structure of the solenoid valve is improved to thus reduce the number of parts, reduce an assembly process, and minimize damage to the solenoid valve due to a high-pressure.

In addition, it is still another object of the present invention to provide a fluid control valve assembly in which a packing member that is in close contact with an existing valve seat to perform an air-tight function is removed and a close attachment portion is integrally formed in a valve member, thereby improving assembly performance, simplifying a manufacturing process, and preventing damage to the valve due to a high-pressure.

In addition, it is still another object of the present invention to provide a fluid control valve assembly in which an assembly structure between an upper plunger and a lower plunger is improved to thus improve assembly performance.

The technical problems to be solved in the present invention are not limited to the above-mentioned technical problems, and the other technical problems that are not mentioned in the present invention may be apparently understood by one of ordinary skill in the art in the technical field to which the present invention belongs.

Technical Solution

To accomplish the above and other objects of the present invention, according to an aspect of the present invention, there is provided a fluid control valve assembly comprising: a main valve body having a first flow passage that is mounted on an inlet of a high-pressure vessel and through which a charging source gas passes, a second flow passage through which a feeding source gas passes, and a third flow passage to which the first flow passage and the second flow passage are connected; a manual valve that is mounted on the main valve body and that opens and closes the third flow passage; a solenoid valve that is mounted on the main valve body and that opens and closes the second flow passage by an electrical signal; a first check valve that is provided on the first flow passage to thus block a reverse flow of the charging source gas; and a second check valve that is provided on the second flow passage to thus block a reverse flow of the feeding source gas, and block the charging source gas from flowing in the second flow passage, to thereby prevent the charging source gas from flowing in the solenoid valve.

Preferably, but not necessarily, the first flow passage and the second flow passage are branched from one end of the third flow passage, and a fourth flow passage in which the charging source gas flows and a fifth flow passage through which the feeding source gas is discharged are connected to the other end of the third flow passage.

Preferably but not necessarily, a filter that filters fine dusts is provided at a portion where the fourth flow passage and the fifth flow passage meet, and a sintering filter is used as the filter.

Preferably but not necessarily, the manual valve comprises a valve body that is coupled to the main valve body, and a valve member that is screwed into the inner surface of the valve body and that opens and closes the third flow passage by rotating the valve body, and a close contact portion that is in close contact with a seat portion formed in the third flow passage is integrally formed at the end of the valve member.

Preferably but not necessarily, the solenoid valve comprises: a valve body that is mounted on the main valve body; a valve seat that is mounted on the lower portion of the valve body; a coil that is mounted on the outer circumferential surface of the valve body and that is powered; a core that is mounted on the inner surface of the valve body; a lower plunger that is disposed movably in the inner surface of the valve body in which an orifice is formed, and on the bottom of which a close contact portion that is in close contact with a valve seat is integrally formed; an upper plunger that is disposed linearly movably at the upper side of the lower plunger, activates in conjunction with the lower plunger, and with which a close contact portion that is in close contact with the orifice is integrally formed; and a spring that is disposed between the upper plunger and the core and that presses the upper plunger to keep the valve closed.

Preferably but not necessarily, the first check valve comprises: a valve seat that is fixed to a mount recess formed in the first flow passage of the main valve body; a valve member that is inserted in the inner surface of the mount recess so as to be linearly movable, and on one surface of which a close contact portion that is in close contact with the valve seat to thus open and close the first flow passage is integrally formed; a valve nut that is coupled to an inlet of the mount recess; and a spring that is disposed between the valve nut and the valve member and that provides an elastic force to the valve member.

Preferably but not necessarily, the second check valve comprises: a seat member that is fixed to a mount recess formed in the second flow passage of the main valve body; and a valve member that is inserted in the inner surface of the mount recess so as to be linearly movable, and that is in close contact with the seat member to thus open and close the second flow passage, in which the valve member is in close contact with the seat member by pressure of the charging source gas.

Preferably but not necessarily, the fluid control valve assembly further comprises an excess flow valve that is mounted in the main valve body and communicates with the second flow passage to thus block the second flow passage if an overflow occurs, in which the excess flow valve comprises: a filter housing that is mounted on the main valve body in which a passage that is in communication with the second flow passage is formed at the center of the filter housing and a filter is mounted in the inner surface of the passage; a valve body that is mounted at one end of the filter housing in which another passage communicating with the passage is formed; a valve member that is arranged in the inner surface of the valve body to be linearly movable, and that is in close contact with one surface of the valve body to thus block the passage if an overflow occurs; a spring that is disposed between the valve member and the valve body and provides a pressing force to maintain the open position the valve member; and a valve nut that is mounted on one surface of the valve body to thus prevent the valve member from being separated from the valve body.

Preferably but not necessarily, the fluid control valve assembly further comprises a pressure relief device that is mounted on the main valve body and connected to a sixth flow passage communicating with the high-pressure vessel, to thus release the pressure in the high-pressure vessel to the outside if temperature of the high-pressure vessel reaches a preset temperature or above, in which the pressure relief device comprises: a valve body that is mounted on the main valve body and communicates with the sixth flow passage; a piston that is disposed in the valve body to be linearly movable, to thus block the sixth flow passage; and a glass bulb that is mounted in the inside of the valve body, and that is ruptured if the temperature of the glass bulb reaches a set temperature or more, to thus linearly move the piston and thereby open the sixth flow passage.

Preferably but not necessarily, the fluid control valve assembly further comprises a bleed valve that is mounted on the main valve body and that discharges the source gas stored in the high-pressure vessel according to a user's operation, in which the bleed valve comprises: a valve body that is mounted on a seventh flow passage that is fixed to the main valve body and connected to the high-pressure vessel; a valve member that is disposed in the valve body to be linearly movable and that is in close contact with a close contact portion that is formed in the valve body, to thus perform an opening and closing action; a nut member that is fixed to the inner surface of the valve body; a spring that is disposed between the nut member and the valve member to thus provide the valve member with an elastic force; and a cap member that is screwed to the inner surface of the seventh flow passage.

Advantageous Effects

As described above, a fluid control valve assembly according to the present invention, is configured to separately include a first flow passage for charging a source gas into a high-pressure vessel and a second flow passage for supplying a source gas stored in a high-pressure vessel for a gas consumer such as a gas engine, in which a first check valve is mounted on the first flow passage and a second check valve is mounted on the second flow passage valve, to thus block the charging pressure of the high-pressure from being applied to a solenoid valve, and to thereby prevent damage to the solenoid valve and prevent a malfunction of the solenoid valve.

In addition, in the case of the fluid control valve assembly according to the present invention, a close contact portion that is in close contact with a valve seat is integrally formed with a valve member in the same material as the valve member, to thus prevent the close contact portion from rupturing due to a high-pressure, extend the life of the valve and prevent a malfunction of the valve.

In addition, in the case of the fluid control valve assembly according to the present invention, structure of the solenoid valve is improved to thus enable a precise control, reduce the number of parts, and minimize damage to the solenoid valve due to a high-pressure.

In addition, in the case of the fluid control valve assembly according to the present invention, a sintering filter is used as a filter for removing foreign materials contained in a source gas, to thereby prevent the filter from being damaged due to a high-pressure.

In addition, in the case of the fluid control valve assembly according to the present invention, a packing member that is in close contact with a valve seat to perform an air-tight function is removed and a close contact portion that plays a role of an existing packing member is integrally formed in a valve member, thereby improving assembly performance, simplifying a manufacturing process, and preventing damage to the valve due to a high-pressure.

In addition, in the case of the fluid control valve assembly according to the present invention, an assembly structure between an upper plunger and a lower plunger is improved to thus improve assembly performance.

BEST MODE

Figure 1:
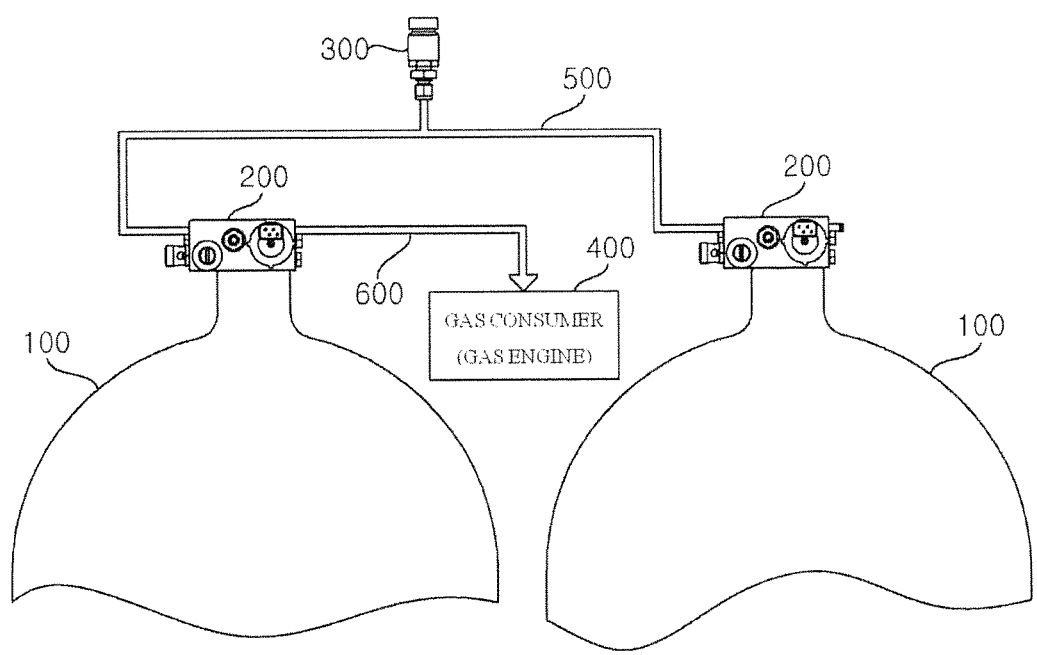
FIG. 1 is a configurational diagram of a fluid control system according to an embodiment of the present invention.

Embodiments of the present invention will be described below in detail with reference to the accompanying drawings. Here, the size or shape of the components illustrated in the drawings may be shown to be exaggerated for convenience and clarity of illustration. In addition, specifically defined terms may be changed according to the intention or practices of users or operators in consideration of the construction and operation of the present invention. The definition of the terms should be made based on contents throughout the present specification.

FIG. 1 is a configurational diagram of a fluid control system according to an embodiment of the present invention.

The fluid control system in accordance with one embodiment of the present invention includes: a high-pressure vessel 100 in which a source gas is stored; a fluid control valve assembly 200 that is attached to an inlet of the high-pressure vessel 100, and that controls a fluid; a source gas charging unit 300 that is connected to the fluid control valve assembly 200 via a first pipe 500 to charge a source gas into the high-pressure vessel 100; and a gas consumer 400 that is connected to the fluid control valve assembly 200 via a second pipe 600 to consume the source gas stored in the high-pressure vessel 100.

The fluid control system according to this embodiment as constructed above is applied to hydrogen fuel cell vehicles and is mainly used to control the flow of a hydrogen fuel. In addition to the hydrogen fuel cell vehicles, the fluid control system can be applied to any system that charges and supplies a high-pressure fluid.

A vessel that can sufficiently safely store a source gas of 700 bars or higher is used as a high-pressure vessel.

The fluid control valve assembly 200 plays a role of controlling the flow of the source gas when the source gas stored in the high-pressure vessel 100 is supplied for the gas consumer 400 such as a gas engine and the source gas is charged into the high-pressure vessel 100.

Figure 2:
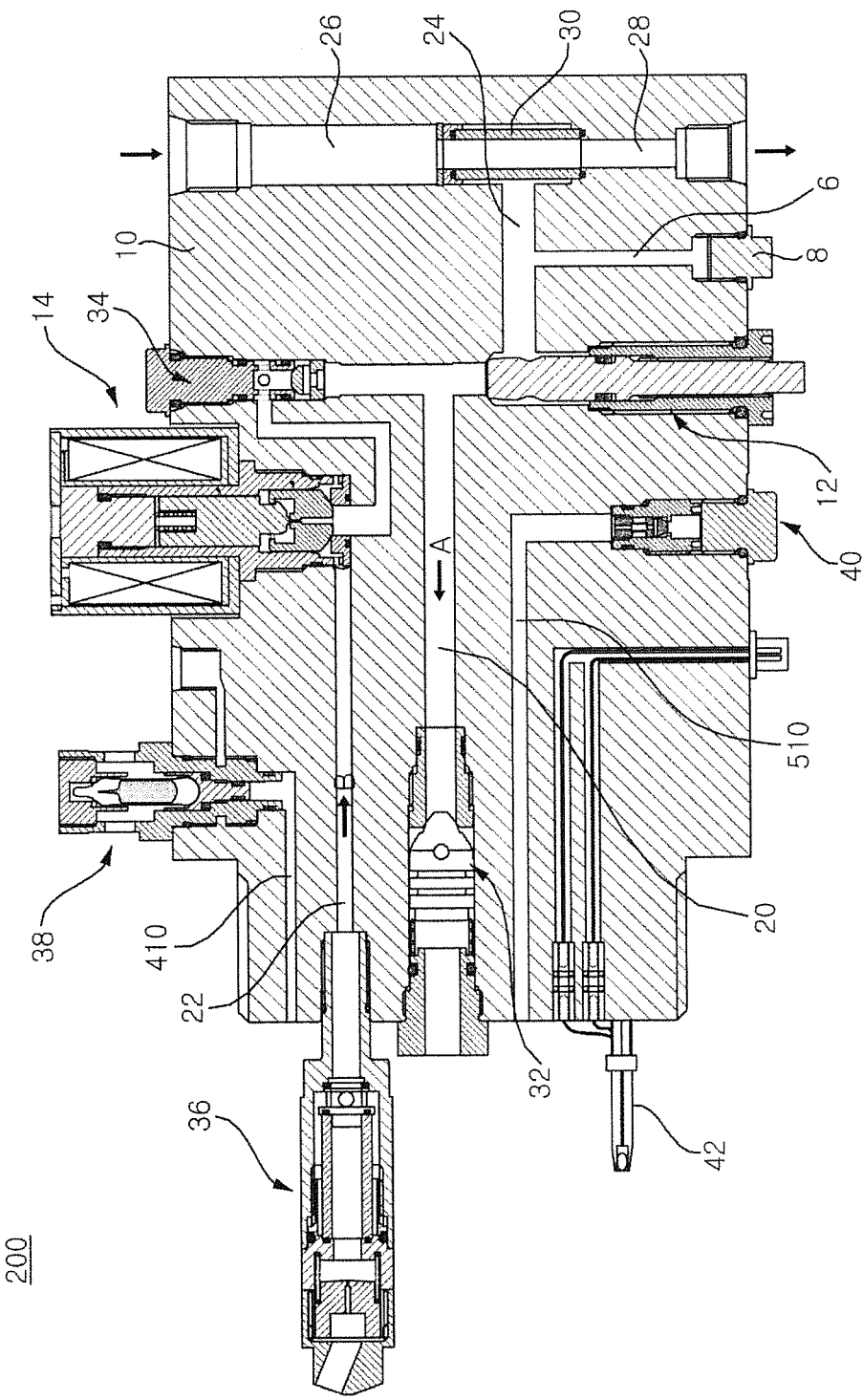
FIG. 2 is a cross-sectional view of a fluid control valve assembly according to an embodiment of the present invention.

FIG. 2 is a cross-sectional view of a fluid control valve assembly according to an embodiment of the present invention.

The fluid control valve assembly 200 according to one embodiment, includes: a main valve body 10 that is mounted on an inlet of a high-pressure vessel 100 filled with a source gas, in which a plurality of valves are provided and a plurality of flow passages are formed; a manual valve 12 that is mounted on the main valve body 10 and that opens and closes the flow passage; and a solenoid valve 14 that is mounted on the main valve body 10 and that automatically opens and closes the flow passage by an electrical signal.

The main valve body 10 includes: a first flow passage 20 that is connected to a high-pressure vessel 100 and through which a charging source gas passes to fill in the high-pressure vessel 100; a second flow passage 22 that is connected to the high-pressure vessel 100 and through which a feeding source gas passes to be fed to a gas consumer such as a gas engine; and a third flow passage 24 to which the first flow passage 20 and the second flow passage 22 are connected and from which the first flow passage 20 and the second flow passage 22 communicate.

In addition, the main valve body 10 includes: a fourth flow passage 26 that is connected to the source gas charging unit 300 and through which the source gas is introduced into a high-pressure vessel 100; and a fifth flow passage 28 that is connected to the gas consumer 400 and through which the source gas is supplied for the gas consumer 400, in which the fourth flow passage 26 and the fifth flow passage 28 communicate from the third flow passage 24.

A filter 30 that filters fine dusts is provided at a portion where the fourth flow passage 26 and the fifth flow passage 28 meet, and a porous sintering filter of 10 μm is used as the filter 30.

In this embodiment, the sintering filter made of a metallic material is used as the filter 30, and thus the filter is prevented from being damaged by pressure of the source gas, and the life of the filter can be prolonged.

A first check valve 32 that opens a flow of a first direction (that is, an arrow direction "A") of the charging source gas charged into the high-pressure vessel 100, and blocks the flow in the reverse direction to the first direction, is mounted on the first flow passage 20, and a second check valve 34 that opens a flow of a second direction (that is, an arrow direction "B") of the feeding source gas charged supplied for the gas consumer 400, blocks the flow in the reverse direction to the second direction, and blocks the charging source gas from being introduced into the solenoid valve 14, is mounted on the second flow passage 22.

The solenoid valve 14 is a valve that is provided on the second flow passage 22 and automatically opens and closes the second flow passage 22 depending on an electric signal, and is provided at the front side of the second check valve 34.

In this way, since the first flow passage 20 through which a charging source gas passes, and the second flow passage 22 through which a feeding source gas passes, are separately formed on the main valve body 10 according to the present embodiment, and the solenoid valve 14 is provided on the second flow passage 22, the second check valve 34 blocks the second flow passage 22 when the source gas is filled in a high-pressure vessel, to thus prevent the charging source gas from being introduced into the solenoid valve 14 and to thereby prevent the solenoid valve 14 from being damaged by the charging pressure of the high-pressure.

Thus, since the solenoid valve 14 is not affected by the charging pressure of the charging source gas, the solenoid valve 14 can be prevented from malfunctioning or reduced durability, and the life of the solenoid valve 14 can be extended.

The manual valve 12 is mounted on the third flow passage 24 and plays a role of manually opening and closing the third flow passage 24. That is, the manual valve 12 opens and closes the third flow passage 24, and thus serves to open and close the flow of the source gas discharged from the high-pressure vessel 100 and the flow of the source gas charged into the high-pressure vessel 100.

An excess flow valve 36 is provided at the entrance of the second flow passage 22, in order to block the source gas stored in the high-pressure vessel 100 from leaking abnormally excessively. That is, since a dangerous situation may occur if the source gas exits from the inside of the high-pressure vessel 100 to the outside thereof in a flash in the case that a pipe of a vehicle is cut off during a vehicle accident or overturn, the excess flow valve 36 blocks the second flow passage 22, and thus serves to prevent accidents in advance.

Further, a pressure relief device 38 and a bleed valve 40 are mounted on the main valve body 10, in which the pressure relief device 38 releases a source gas pressure from the inside of the high-pressure vessel 100 to the outside of the high-pressure vessel 100, and the bleed valve 40 releases a source gas from the inside of the high-pressure vessel 100 to the outside of the high-pressure vessel 100, to thus prevent explosion in the high-pressure vessel, if the temperature of the high-pressure vessel 100 rises up in case of a fire due to a vehicle accident.

In addition, a thermistor 42 is mounted at one side of the main valve body 10, in which the thermistor 42 measures the temperature of the source gas stored in the high-pressure vessel 100 and applies the measured signal to a control unit.

In addition, a branch flow passage 6 is formed in the main valve body 10, in which the branch flow passage 6 is in communication with the third flow passage 24 and into which a source gas passing through the branch flow passage 6 is introduced, and a pressure sensor 8 that measures the pressure of the source gas is mounted on the branch flow passage 6.

Figure 3:
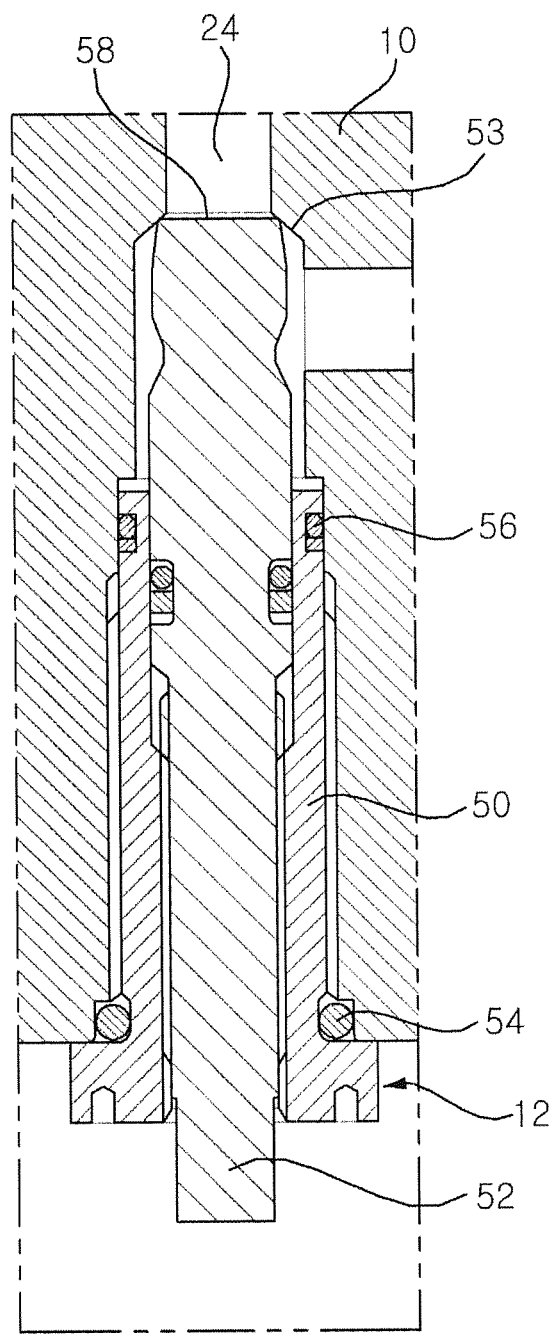
FIG. 3 is across-sectional view of a manual valve in accordance with an embodiment of the present invention.
Figure 4:
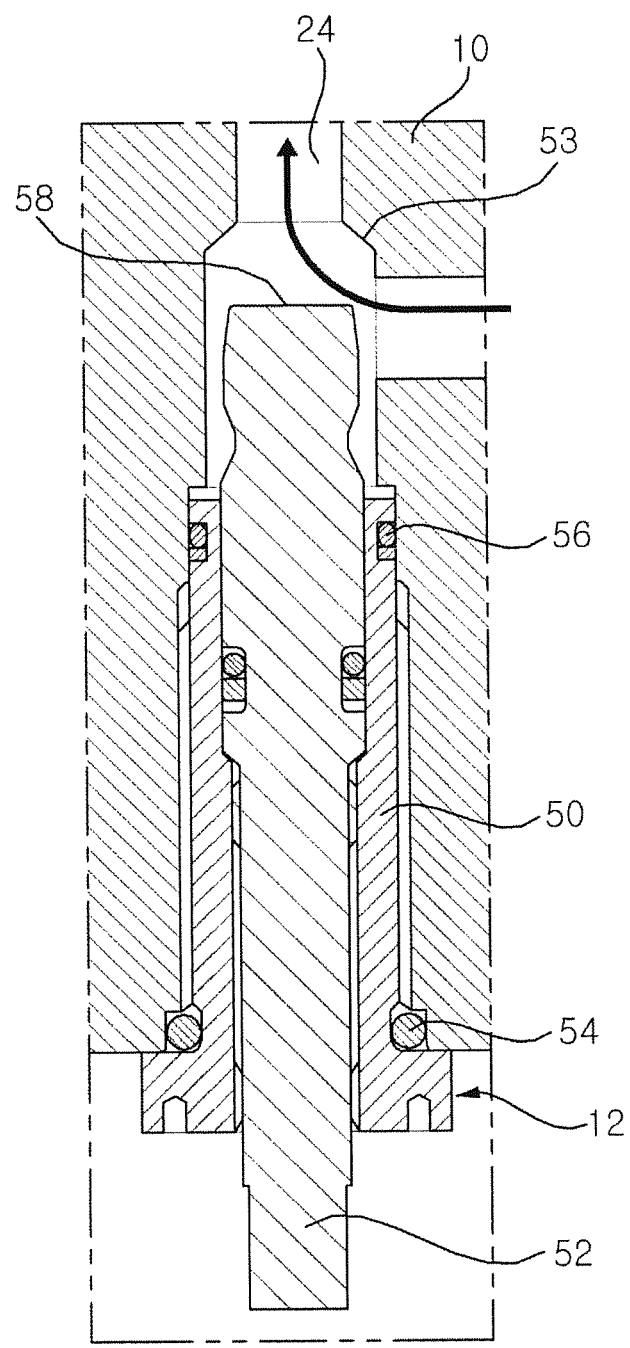
FIG. 4 is a cross-sectional view showing the operation of the manual valve in accordance with an embodiment of the present invention.

FIG. 3 is a cross-sectional view of a manual valve in accordance with an embodiment of the present invention. FIG. 4 is a cross-sectional view showing the operation of the manual valve in accordance with an embodiment of the present invention.

The manual valve 12 according to one embodiment includes: a valve body 50 whose outer circumferential surface is coupled to the main valve body 10; and a valve member 52 that is screwed on the inner surface of the valve body 50, to thus open and close the third flow passage 24.

The valve body 50 is formed in a cylindrical shape, in which the outer circumferential surface of the valve body 50 is screwed on the main valve body 10, and the inner circumferential surface of the valve body 50 is screwed onto the outer circumferential surface of the valve member 52. Thus, if the valve member 52 is made to rotate, the valve member 52 goes forward and backward to thus open and close the valve member 52.

The valve member 52 is formed with a steel material in a cylindrical rod shape, and a close contact portion 58 that is closely attached on a seat portion 53 formed on the third flow passage 24 is integrally formed at the end of the valve member 52.

Although the conventional valve member has a structure in which a close contact member made of a material such as a rubber material different from that of a valve rod is mounted at the end of the valve rod in most cases, the close contact member may be torn by the high-pressure in this case. In addition, since the close contact member should be assembled with the valve rod when assembling the valve member, the valve assembly performance is lowered.

In this embodiment, the valve member 52 is formed with a stainless steel material, and integrally formed with the close contact portion 58, to thus make it easy to manufacture and assemble the valves and prevent breakage and damage of the close contact portion 58 by a high-pressure.

A first seal ring 54 is provided between the valve body 50 and the main valve body 10, and a second seal ring 56 is provided on the outer circumferential surface of the valve member 52, in order to keep the airtight with respect to the valve body 50.

As shown in FIG. 3, when the valve member 52 is rotated in one direction, the valve member 52 is advanced and the close contact portion 58 of the valve member is in close contact with the seat portion 53, to thereby block the third flow passage 24. As shown in FIG. 4, when the valve member 52 is rotated in the opposite direction, the valve member 52 is retracted and the close contact portion 58 is separated from the seat portion 53, to thereby open the third flow passage 24.

Figure 5:
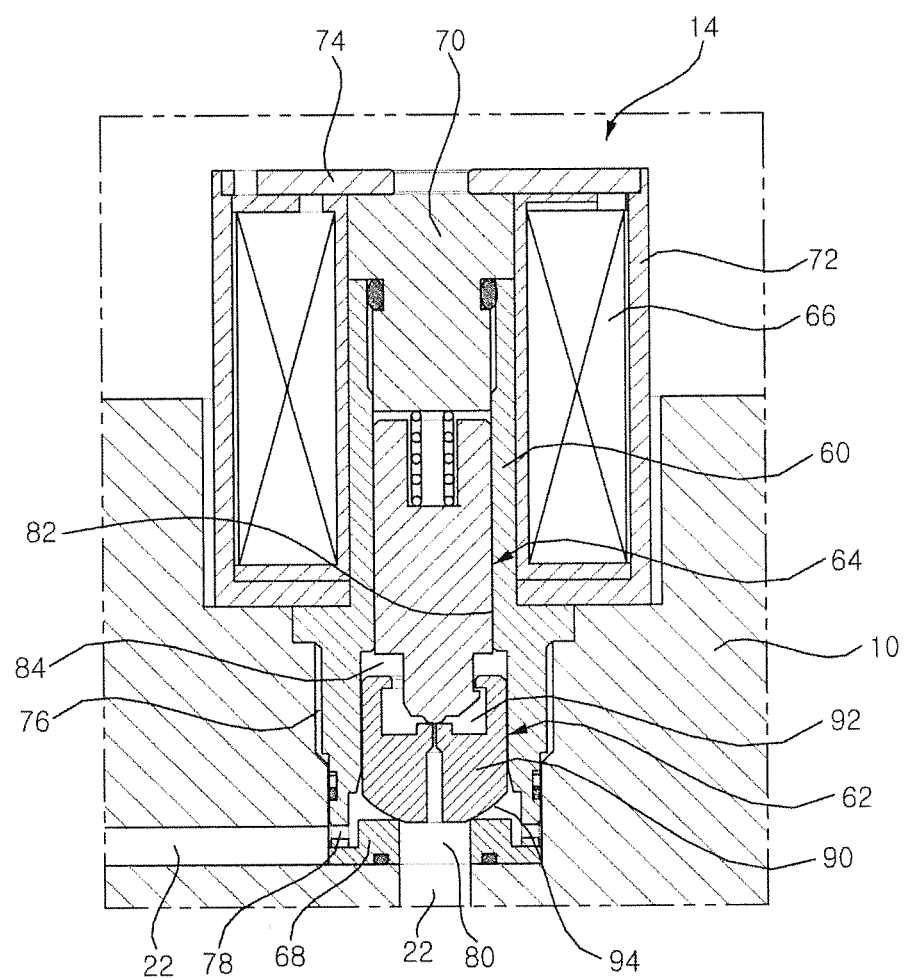
FIG. 5 is a cross-sectional view of a solenoid valve according to an embodiment of the present invention.
Figure 6:
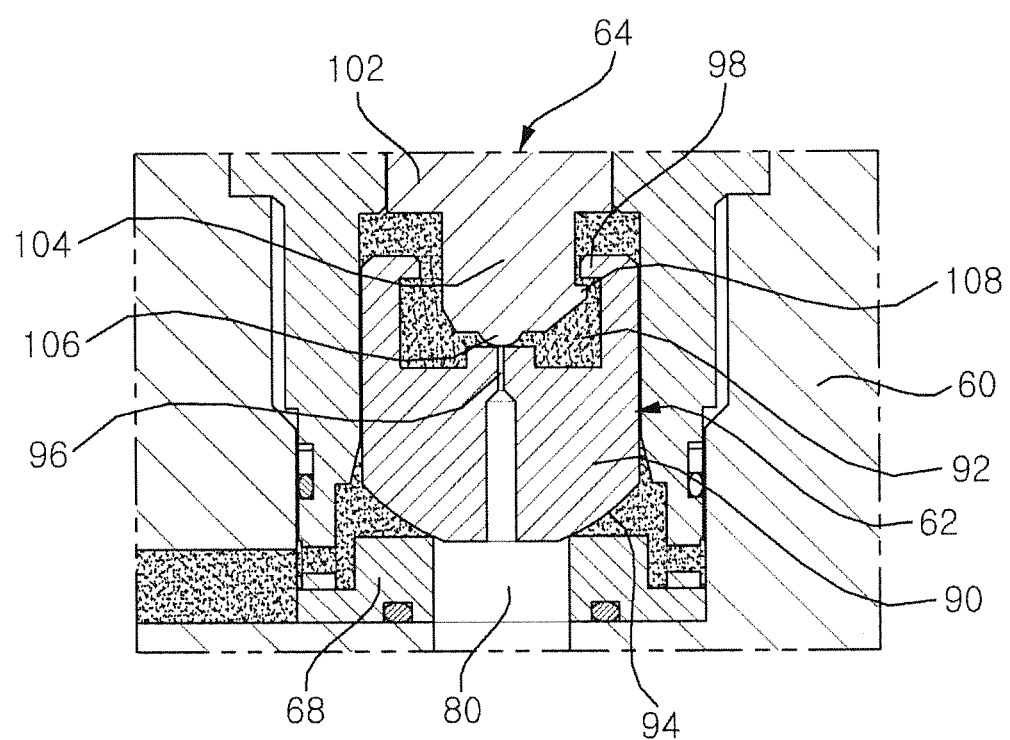
FIG. 6 is a partially enlarged cross-sectional view of the solenoid valve according to an embodiment of the present invention.
Figure 7:
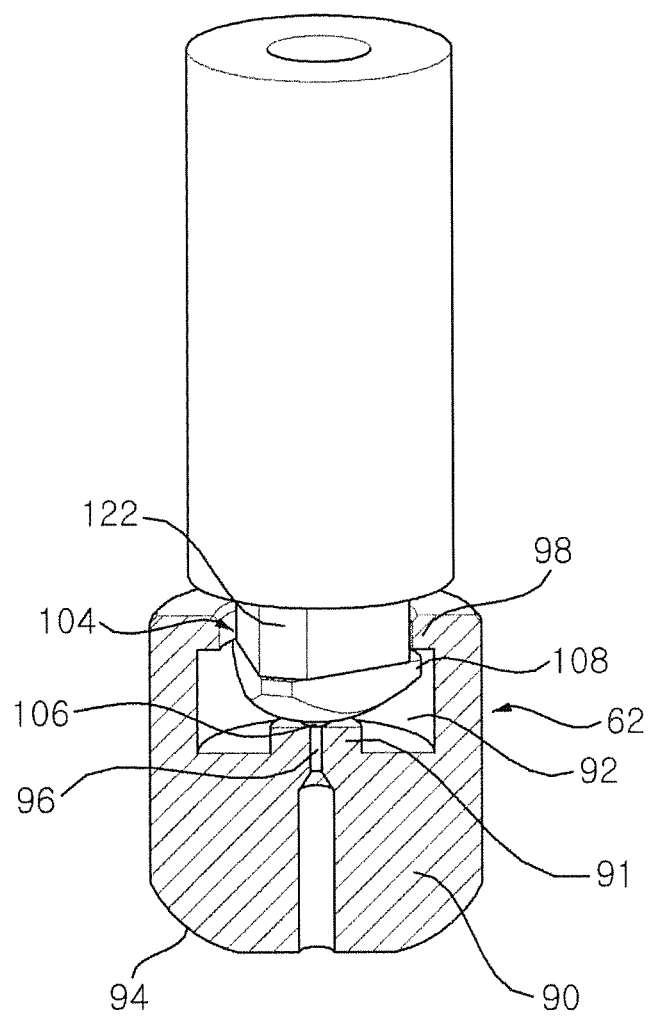
FIG. 7 is a perspective view of an upper plunger and a lower plunger of the solenoid valve according to an embodiment of the present invention.
Figure 8:
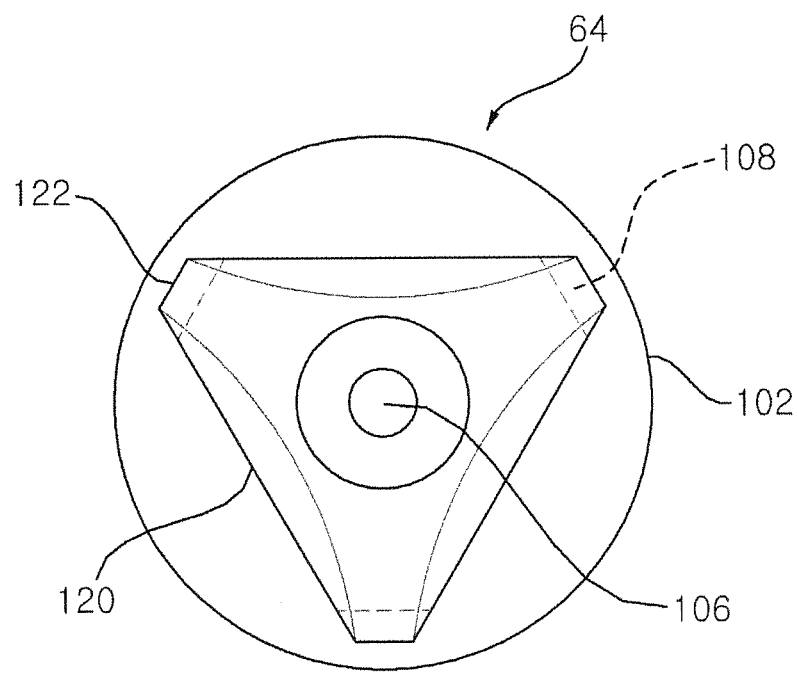
FIG. 8 is a bottom view of an upper plunger of the solenoid valve according to an embodiment of the present invention.

FIG. 5 is a cross-sectional view of a solenoid valve according to an embodiment of the present invention. FIG. 6 is a partially enlarged cross-sectional view of the solenoid valve according to an embodiment of the present invention. FIG. 7 is a perspective view of an upper plunger and a lower plunger of the solenoid valve according to an embodiment of the present invention. FIG. 8 is a bottom view of an upper plunger of the solenoid valve according to an embodiment of the present invention.

The solenoid valve 14 is a valve that automatically opens and closes the second flow passage 22, when the power is on, and includes; a valve body 60 that is mounted on the main valve body 10; a valve seat 68 that is mounted on the lower portion of the valve body 60 and is in communication with the second flow passage 22; a coil 66 that is mounted on the outer circumferential surface of the valve body 60 and that is powered; an upper plunger 64 that is disposed linearly movably on the inner surface of the valve body 60 and that is linearly moved by mutual action with the coil 66 when the coil 66 is powered; and a lower plunger 62 that is activated in conjunction with the upper plunger 64, and that is in close contact with a valve seat 68.

The valve body 60 is formed of a cylindrical shape in which upper and lower surfaces of the valve body 60 are opened. A core 70 is mounted on the upper surface of the valve body 60 to thus seal the upper surface of the valve body 60. A screw coupling portion 76 is formed on the lower outer circumferential surface of the valve body 60, so as to be screwed on the main valve body 10, and an inlet 78 through which the source gas is introduced in communication with the second flow passage 22 is formed on the lower lateral surface of the valve body 60.

Since the screw coupling portion 76 of the valve body 60 is formed on the lower outer circumferential surface of the valve body 60 so as to be screwed on the main valve body 10, and a portion where the coil 60 is wound is inserted into the main valve body 10, the screw coupling portion 76 is tightened so as to be screwed and coupled with the main valve body 10 when assembling the solenoid valve 14 with the main valve body 10, to thereby complete the assembly of the solenoid valve 14 with the main valve body 10. Accordingly, the solenoid valve 14 is conveniently assembled with and separated from the main valve body 10.

A first seal ring 112 is provided between the outer circumferential surface of the core 70 and the inner circumferential surface of the valve body 60, to thus perform airtight between the core 70 and the valve body 60, and a second seal ring 114 is mounted on the outer circumferential surface of the valve body 60, to thus maintain airtight between the main valve body 10 and the valve body 60.

In addition, a first space portion 82 with which the upper plunger 64 is movably in close contact and a second space portion 84 that is formed at the lower side of the first space portion 82 so as to have an inner diameter larger than that of the first space portion 82 and with which the lower plunger 82 is movably in close contact, in which the source gas is introduced through the second space portion 84.

The valve seat 68 is fixed on the lower surface of the valve body 60, in which an outlet 80 through which the source gas is discharged is formed in the valve seat 68. Here, the upper part of the outlet 80, that is, a portion where a close contact portion 94 of the lower plunger 90 contacts is formed at a right angle, to thus be initially in line contact with the close contact portion 94 of the lower plunger 90. In addition, a surface is created on the upper portion of the outlet 80 by repeated use, to thus be in surface contact with the close contact portion 94 of the lower plunger 90.

Here, the outlet 80 is in communication with the second flow passage 22. A third seal ring 116 is mounted on the lower surface of the valve seat 68, to thus perform an airtight action between the valve seat 68 and the main valve body 10.

A coil case 72 is mounted on the outer circumferential surface of the coil 66, in order to protect the coil 66, and a circular plate member 74 surrounding the core 70 is mounted on the top surface of the coil case 72.

The lower plunger 62 includes: a body portion 90 that is arranged to be movable up and down at a close contact state on the inner surface of the second space portion 84; a recess portion 92 that is formed on the upper surface of the body portion 90 and is locked with the upper plunger 64, and through which the source gas is introduced; a close contact portion 94 that is formed on the lower surface of the body portion 90 and that is in close contact with the valve seat 68, to thus seal the outlet 80 of the valve seat 68; and an orifice 96 that is formed vertically from the recess portion 92 and through which the source gas passes.

A seat portion 91 that protrudes upwards is formed at the center of the inner surface of the lower plunger 62, in which the orifice 96 is formed in the seat portion 91. In addition, a locking bar 98 that extends inwards is formed around the circumferential direction of an open upper surface of the recess portion 92, to thus be locked with a locking protrusion 108 of the upper plunger 64.

When the close contact portion 94 is formed of a curved surface shape on the lower surface of the body portion 90 is in close contact with the upper surface of the valve seat 68, the end portion of the close contact portion 94 is inserted into the outlet 80 of the valve seat 68, to thus more completely seal the outlet 80 of the valve seat 68.

Here, the lower plunger 62 is formed of a metallic material, for example, a stainless steel material, and the body portion 90 and the close contact portion 94 are integrally formed, to thereby prevent the close contact portion 94 from being damaged due to the shock or pressure of the source gas flow, and to thus improve assembly performance. That is, in the case of the conventional lower plunger, a packing member made of a material different from that of the lower plunger is mounted on the lower plunger, in which case the packing member should be assembled with the lower plunger to thereby cause the manufacturing process to be complicated and the packing member is formed of a brass or rubber material, to thereby cause a break or tear problem when impact is applied.

The lower plunger 62 in this embodiment is configured to have the body portion 90 and the close contact portion 94 that are integrally formed, to thus solve the above-described break or tear problem.

The upper plunger 64 includes: a body portion 102 that is in close contact with the inner surface of the first space portion 82 of the valve body 60 and that is linearly moved; a connecting portion 104 that is integrally formed on the bottom of the body portion 102, and inserted into the recess portion 92 of the lower plunger 62 to then be linearly movable; and a close contact portion 106 that is formed on the end portion of the connecting portion 104, and that is in close contact with the seat portion 91 of the lower plunger 62, to thereby seal the orifice.

A spring receiving groove 69 is formed on the top surface of the body portion 102, in which a spring 71 is inserted into the spring receiving groove 69. The spring 71 is formed of a coil spring whose one end is supported on the lower surface of the core 70 to thus press the upper plunger 64 so that the valve is closed.

The connecting portion 104 is integrally formed on the bottom of the body portion 102, and is formed in a polygonal shape in cross section. That is, the lateral surface of the connecting portion 104 includes: a number of first planar portions 120 each having a large area; a number of second planar portions 122 that are formed between the first planar portions 120 and each of which has a smaller area than each of the first planar portions 120; and a locking protrusion 108 that protrudes outwards from the end portion of each of the second planar portions 122.

Here, in the case of the connecting portion 104, it is preferable that three first planar portions 120 are provided to form the cross-sectional shape of the connecting section 104 into a triangular shape, and three vertices of the triangular shape are formed into planar shapes to thus form the second planar portions 122.

In addition, the close contact portion 106 is formed of a hemisphere shape on the lower surface of the connecting portion 104, to thus seal the orifice 96.

Here, since the body portion 102 and the close contact portion 106 are formed integrally in the upper plunger 64, it is possible to reduce the number of components by eliminating a configurational element such as an existing packing member, and to improve the assembly performance.

In addition, it is possible to prevent the close contact portion 106 from being broken by a high-pressure since the close contact portion 106 is formed integrally with the body portion 102 in the same metallic material as that of the body portion 102.

Figure 9:
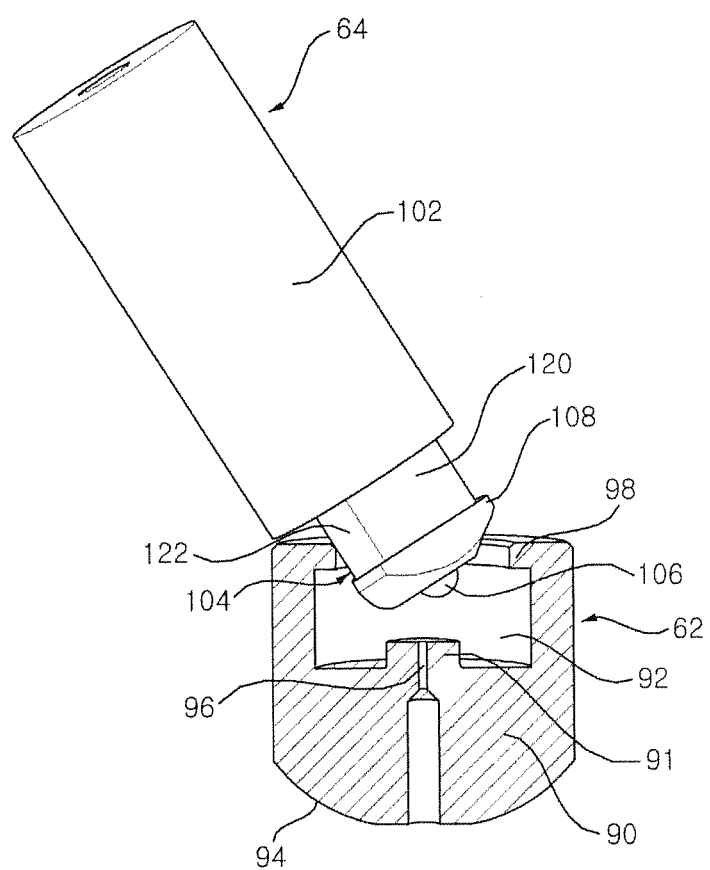
FIGS. 9 and 10 are assembly flow diagrams illustrating an assembly process of an upper plunger and a lower plunger, according to an embodiment of the present invention.
Figure 10:
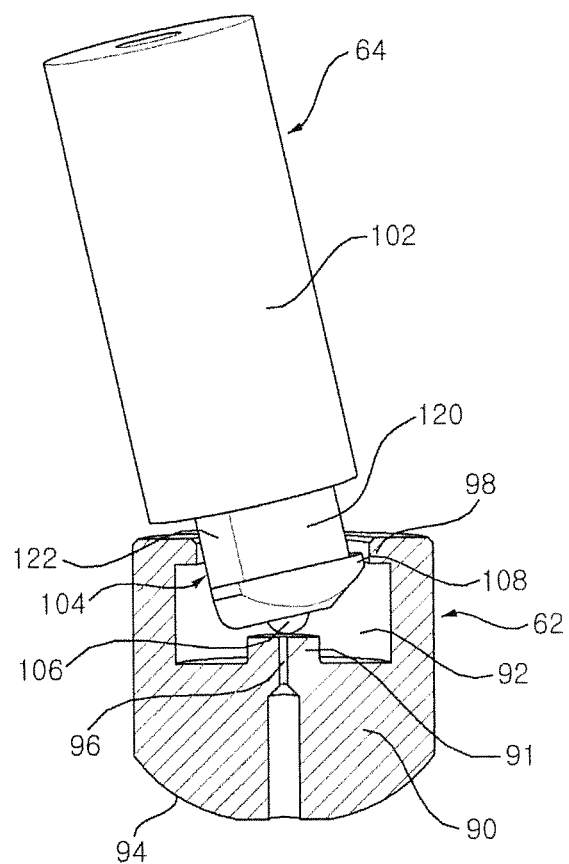

FIGS. 9 and 10 are perspective views illustrating an assembly process of an upper plunger and a lower plunger, according to an embodiment of the present invention.

Looking at the assembly process between the upper plunger 64 and the lower plunger 62, the upper plunger 64 is made to be inclined at an angle and then the connecting portion 104 of the upper plunger 64 is inserted into the recess portion 92 of the lower plunger 62. Here, the locking protrusion 108 at one side of the upper plunger 64 is inserted into the recess portion 92. In this state, if the upper plunger 64 is erected up gradually, the locking protrusion 108 at the other side of the upper plunger 64 is inserted into the recess portion 92.

Here, the locking protrusion 108 is not formed on the entire lower surface of the connecting portion 104 of the upper plunger 64 but is formed only on the second planar portion 122 with a small area. Accordingly, when the one-side locking protrusion 108 is first inserted into the recess portion 92 at a state where the upper plunger 64 is laid at an inclined angle, and then the upper plunger 64 is erected, the other-side locking protrusion 108 of the upper plunger 64 is not also locked with the locking bar 98 and is inserted into the recess portion 92.

Further, if the upper plunger 64 is erected up, the locking projection 108 is locked with the locking bar 98 and thus an assembly of the upper plunger 64 and the lower plunger 62 is completed.

In this way, when assembling the upper and lower plungers of the solenoid valve, bolt fastening or fitting assembly may not be required, to thus improve the assembling performance and make it easy and convenient to assemble the solenoid valve.

The operation of the solenoid valve according to one embodiment as constructed above will follow.

Figure 11:
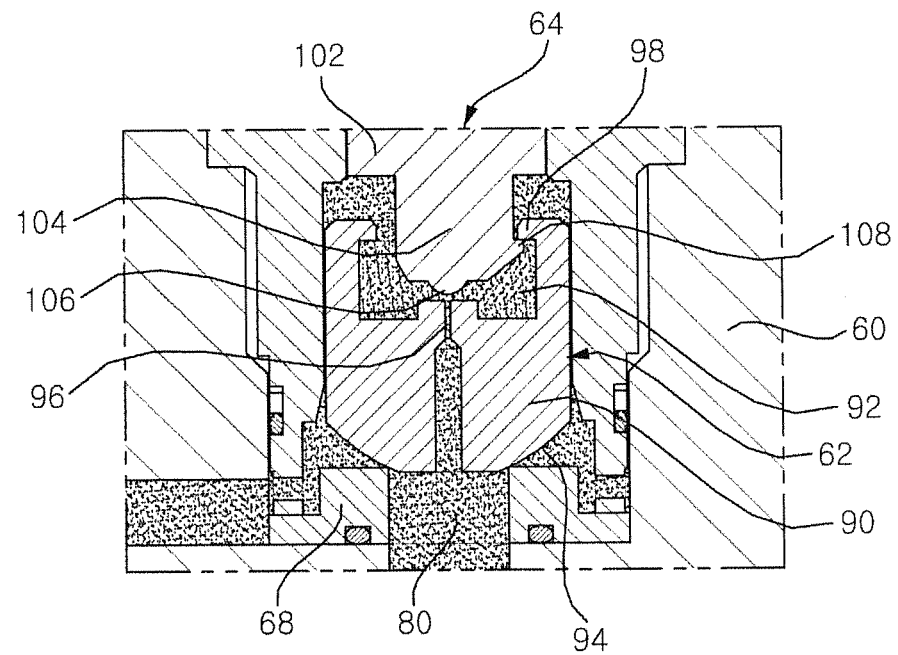
FIGS. 11 and 12 are cross-sectional views showing the operation of the solenoid valve in accordance with an embodiment of the present invention.
Figure 12:
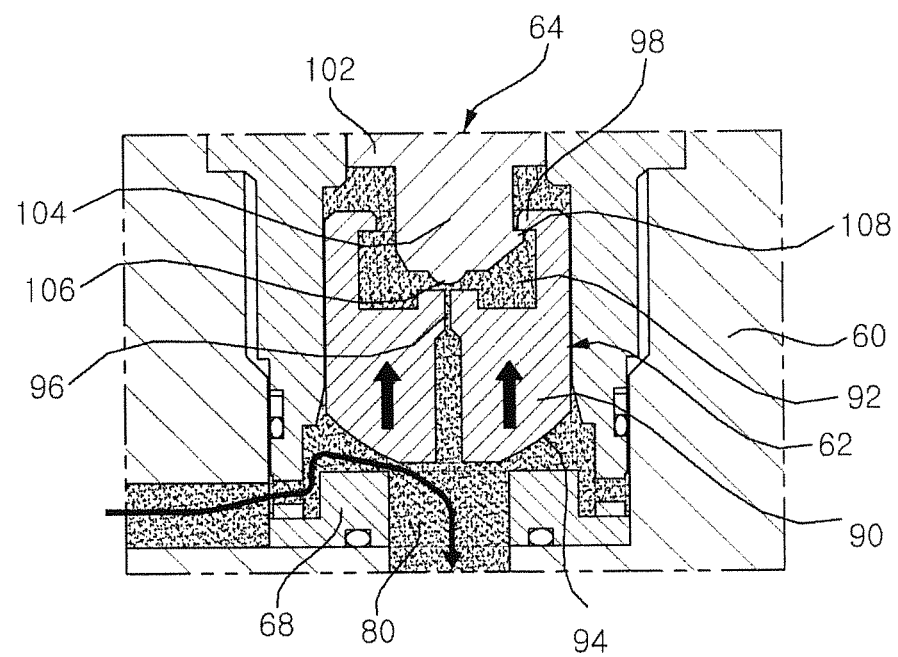

FIGS. 11 and 12 are cross-sectional views showing the operation of the solenoid valve in accordance with an embodiment of the present invention.

First, once the upper plunger 64 is lowered by a pressing force of a spring 71, and thus the lower plunger 62 is pushed, the close contact portion 94 of the lower plunger 62 is in close contact with the valve seat 68 and thus the second flow passage 22 maintains closed. Then, the close contact portion 106 of the lower plunger 62 is in close contact with the orifice 96, and thus the orifice 96 maintains closed. In this case, the source gas is introduced into the inlet 78 and is fully filled in the recess portion 92.

As shown in FIG. 11, when the power is applied to the coil 66, in this state, the upper plunger 64 rises up, and thus the close contact portion 106 of the upper plunger 64 is separated away from the bottom surface of the lower plunger 62 to simultaneously open the orifice 96. Then, the source gas filled in the recess portion 92 becomes a primary open state while passing through the orifice 96 and mitigates the impact when the valve is open and closed.

In addition, as shown in FIG. 12, when the upper plunger 64 further rises up, the locking protrusion 108 of the upper plunger 64 is in contact with the locking bar 98 of the lower plunger 62 and thus the lower plunger 62 is raised up together with the upper plunger 64. Then, the contact portion of the lower plunger 62, 94 is separated from the valve seat 68 to simultaneously the outlet 80 of the valve seat 68. Accordingly, the second flow passage 22 is opened and becomes a secondary open state. As a result, the source gas stored in the high-pressure vessel 100 is supplied to a gas consumer 400 such as a gas engine through the second flow passage 22.

Figure 13:
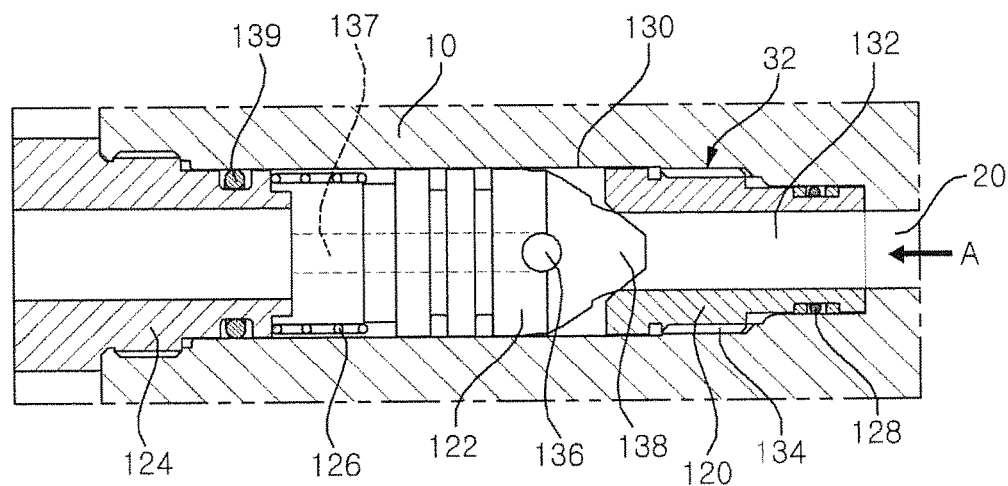
FIG. 13 is a cross-sectional view of a first check valve according to an embodiment of the present invention.
Figure 14:
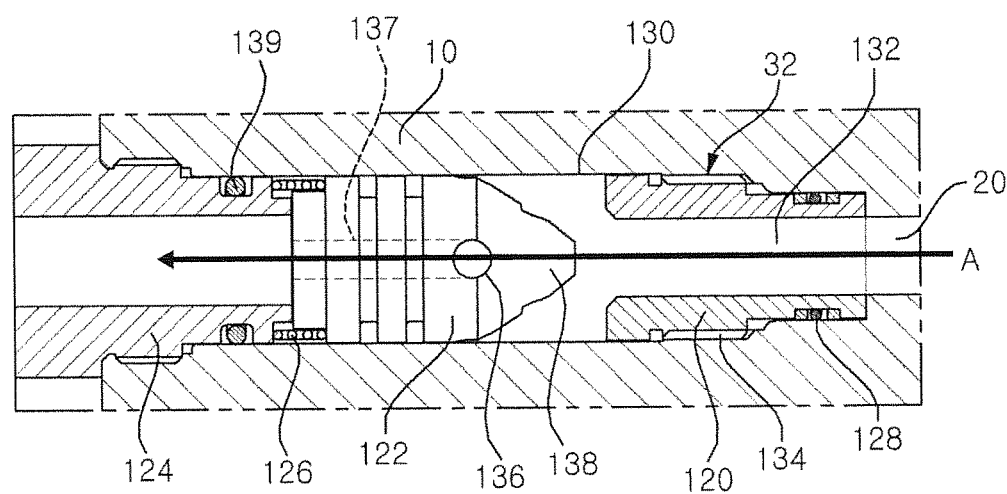
FIG. 14 is a cross-sectional view showing the operation of a first check valve according to an embodiment of the present invention.

FIG. 13 is a cross-sectional view of a first check valve according to an embodiment of the present invention. FIG. 14 is a cross-sectional view showing the operation of a first check valve according to an embodiment of the present invention.

A first check valve 32 includes: a valve seat 120 that is fixed to an inner portion of a mount recess 130 formed in the first flow passage 20 of the main valve body 10; a valve member 122 that is inserted in the inner surface of the mount recess 130 so as to be linearly movable, and that is in close contact with the valve seat to thus open and close the first flow passage 20; a valve nut 124 that is coupled to an inlet of the mount recess 130; and a spring 126 that is disposed between the valve nut 124 and the valve member 122 and that provides an elastic force to the valve member 122.

The valve seat 120 is formed of a cylindrical shape having a passage 132 for passing the source gas, in which a screw coupling portion 134 that is screwed on the inner surface of the mount recess 130 is formed on the outer circumferential surface of the valve seat 120, and a seal ring 128 is mounted on the outer circumferential surface of the valve seat 120, to thereby maintain airtight between the valve seat 120 and the inner surface of the mount recess 130.

The valve member 122 is configured to have a close contact portion 138 that is inserted into the passage 132 of the valve seat 120 to the front portion of the valve member 122 to thus open and close the passage 132, and a plurality of passages 136 that are formed at the lateral surface of the valve member 122, in which the passages 136 are in communication with a passage 137 formed at the center of the valve member 122.

The valve nut 124 prevents the valve member 122 from being separated from the mount recess 130 since the outer circumferential surface of the valve nut 124 is screwed on the inner surface of the mount recess 130, and performs an airtight function since the seal ring 139 is provided at one side of the valve nut 124.

The spring 126 may be formed of a coil spring to provide an elastic force to the valve member 122 since one end of the spring 126 is supported on the valve nut 124, and the other end thereof is supported on the valve member 122.

As shown in FIG. 14, this first check valve 32 is separated from the valve seat 120 and opens the first flow passage 20, while the valve member 122 is retracted back by the pressure of the source gas if the source gas is introduced through the first flow passage 20 in the arrow direction A. In addition, when the supply of the charging source gas stops, the valve member 122 is in close contact with the valve seat 120 by the elastic force of the spring 126, thereby preventing the back flow of the source gas in the opposite direction.

Figure 15:
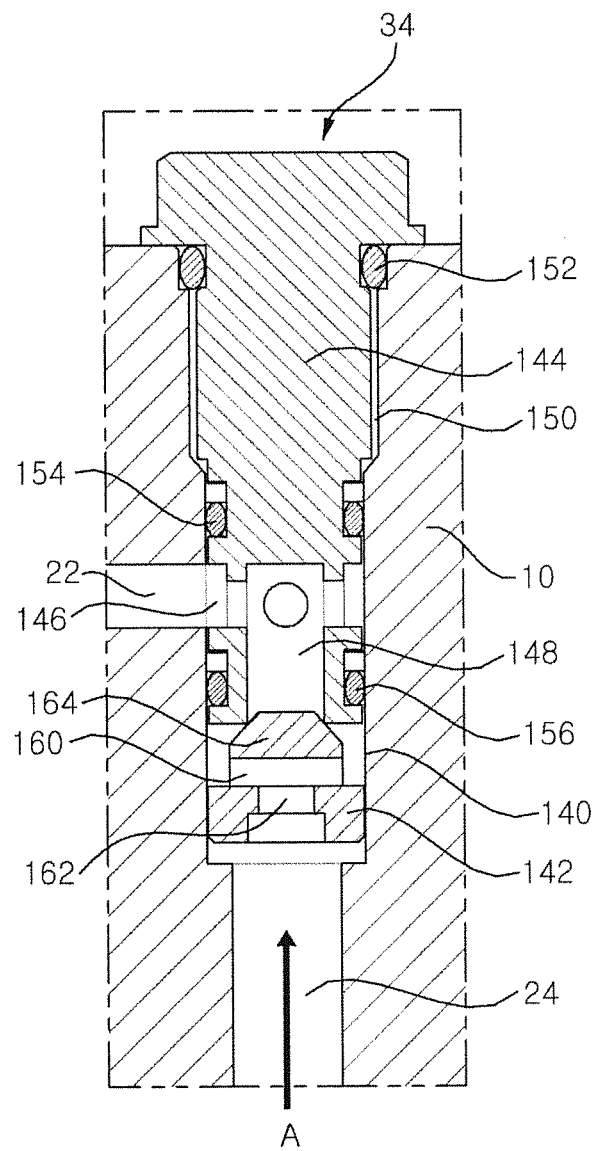
FIG. 15 is a cross-sectional view of a second check valve according to an embodiment of the present invention.
Figure 16:
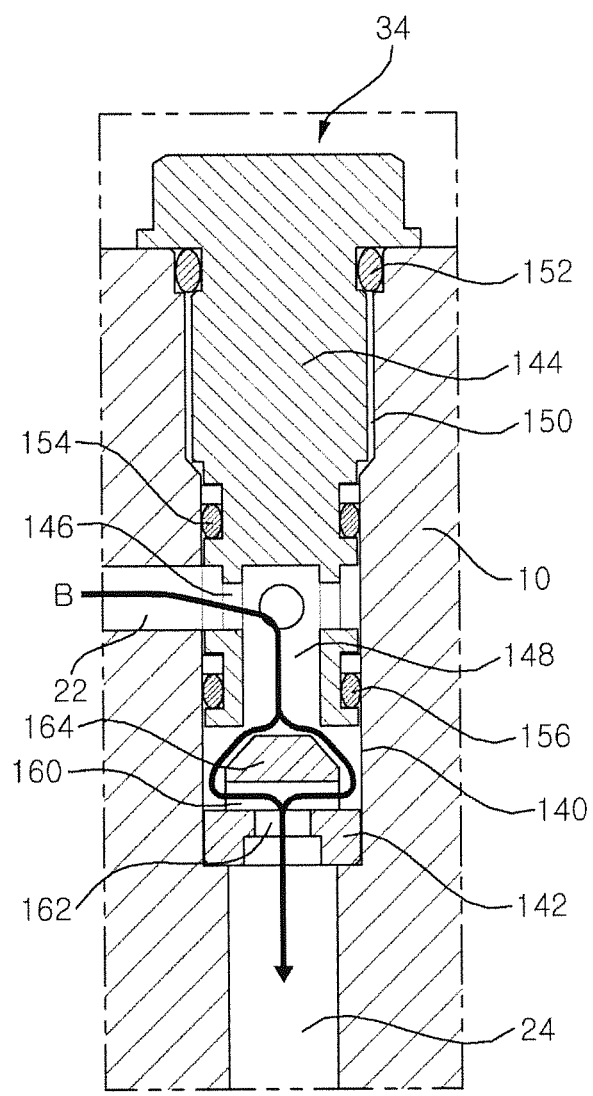
FIG. 16 is a cross-sectional view showing the operation of a second check valve according to an embodiment of the present invention.

FIG. 15 is a cross-sectional view of a second check valve according to an embodiment of the present invention. FIG. 16 is a cross-sectional view showing the operation of a second check valve according to an embodiment of the present invention.

A second check valve 34 includes: a seat member 144 that is fixed to a mount recess 140 formed so as to be in communication with the second flow passage 22 of the main valve body 10; and a valve member 142 that is inserted in the inner surface of the mount recess 140 so as to be linearly movable, and that is in close contact with the seat member 144 to thus open and close the second flow passage 22.

The seat member 144 is configured to include: a screw coupling portion 150 that is formed on the outer circumferential surface of the seat member 144 so as to be screwed on the inner surface of the mount recess 140; a first flow passage 146 that is formed on the lateral surface of the seat member 144 so as to be in communication with one side of the second flow passage 22; and a second first passage 148 that is formed on the bottom surface of the seat member 144 so as to be in communication with of the first flow passage 146. In addition, a plurality of seal rings 152, 154, and 156 maintaining airtight are mounted on the outer circumferential surface of the sheet member 144.

The valve member 142 is inserted in the inner surface of the mount recess 140 so as to be linearly movable, in which a close contact portion 164 formed of a slope so as to be in close contact with the lower surface of the sheet member 144 is formed at one side of the valve member 142, a third passage 160 through which the source gas passes is formed at the side surface of the valve member 142, and a fourth passage 162 communicating with the third passage 160 is formed at the lower surface of the valve member 142.

The valve member 142 rises up by the pushing force of the charging source gas, if the charging source gas is introduced into the valve member 142 through the third flow passage 24 in the arrow direction A, and thus a close contact portion 164 of the valve member 142 is in close contact with the seat member 144, to thereby close the second flow passage 22. Therefore, the second check valve 34 prevents the charging source gas from being introduced into the second flow passage 22 and thus prevents the high-pressure of the charging source gas from affecting the solenoid valve 14.

In addition, as shown in FIG. 16, the solenoid valve 14 is opened and thus the feeding source gas is introduced through the second flow passage 22 as shown in the arrow B. As a result, the valve member 142 falls down by the pressure of the source gas to thus open the second flow passage 22.

Figure 17:
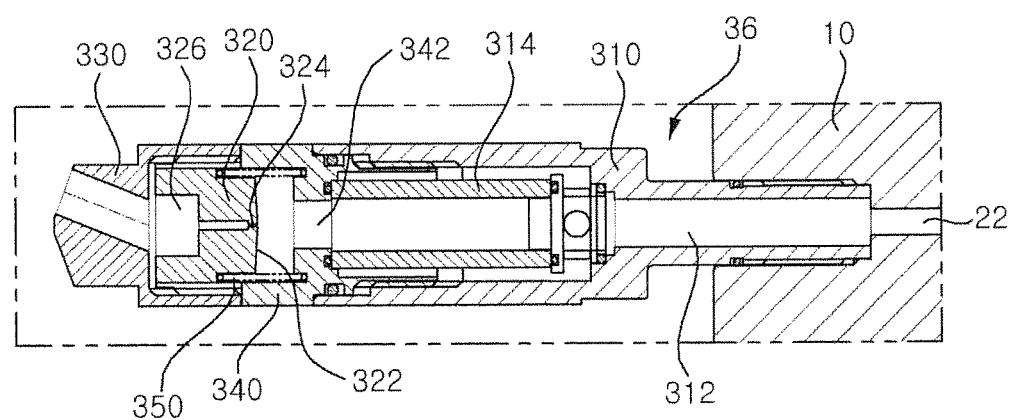
FIG. 17 is a cross-sectional view of an excess flow valve according to an embodiment of the present invention.
Figure 18:
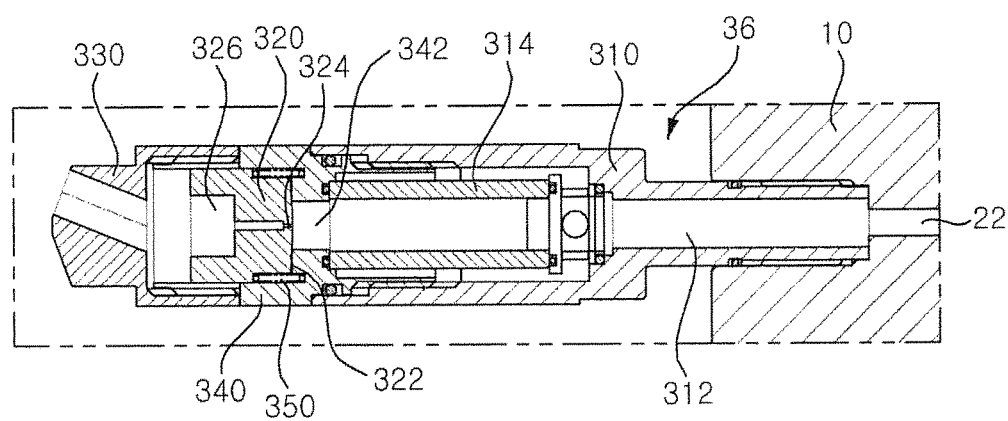
FIG. 18 is a cross-sectional view showing the operation of an excess flow valve according to an embodiment of the present invention.

FIG. 17 is a cross-sectional view of an excess flow valve, that is, an overflow blocking valve, according to an embodiment of the present invention. FIG. 18 is a cross-sectional view showing the operation of an excess flow valve according to an embodiment of the present invention.

The excess flow valve 36 includes: a filter housing 310 that is mounted on the main valve body 10 in which a passage 312 that is in communication with the second flow passage 22 is formed at the center of the filter housing 310 and a filter 314 is mounted in the inner surface of the passage 312; a valve body 340 that is mounted at one end of the filter housing 310 in which another passage 342 communicating with the passage 312 is formed; a valve member 320 that is arranged in the inner surface of the valve body 340 to be linearly movable, and that is in close contact with one surface of the valve body 340 to thus block the passage 342 if an overflow occurs; a spring 350 that is disposed between the valve member 320 and the valve body 340 and provides a pressing force to maintain the open position the valve member 320; and a valve nut 330 that is mounted on one surface of the valve body 340 to thus prevent the valve member 320 from being separated from the valve body 340.

The filter 314 is formed of a cylindrical shape, and has a structure that the filter 314 is mounted at an interval from the inside of the filter housing 310 so that the source gas introduced into the filter housing 310 is purified while passing through the filter 314 and then discharged to the outside of the filter 314.

In the case of a conventional filter, a mesh filter is mainly used as the filter 314. The mesh filter may be broken if the high-pressure is applied thereto. However, since a sintering filter having a size sufficiently considering a flow rate in this embodiment is used as the filter 314, the filter can be prevented from being damaged or torn even if the high-pressure is applied thereto.

The valve member 320 has a structure through which the source gas can pass in which a passage 326 is formed in a rectangular shape in cross section, and through which the source gas is introduced. One surface of the valve member 320 is in close contact with one surface of the valve body 340, in which a close contact portion 322 that blocks a passage 342 is formed on the one surface of the valve member 320. In addition, an orifice 324 is formed on the valve member 320. Accordingly, when the valve member 320 is in close contact with the valve body 340, the source gas is supplied to the passage 342 through the orifice 324.

Looking at the operation of the excess flow valve 36 according to one embodiment, as constructed above, the source gas passes smoothly through the second flow passage 22, while maintaining the distance between the valve member 320 and the valve body 340 by the pressing force of the spring 350 in the case that the source gas pressure is normal. Here, the source gas is filtered of foreign matters while passing through the filter 314, and then is fed to the second flow passage 22.

In this state, as shown in FIG. 18, when an unusually excessive leakage of the source gas inside the high-pressure vessel 100 occurs in the case that a pipe of a vehicle is cut off during a vehicle accident or overturn, the valve member 320 is advanced by a pressure difference in the valve body to then be in close contact with the valve body 340. Then, the passage 342 of the valve body 340 is cut off to thus stop the supply of the source gas. In this case, a small amount of source gas is discharged slowly through the orifice 324 formed on the valve member 320.

Figure 19:
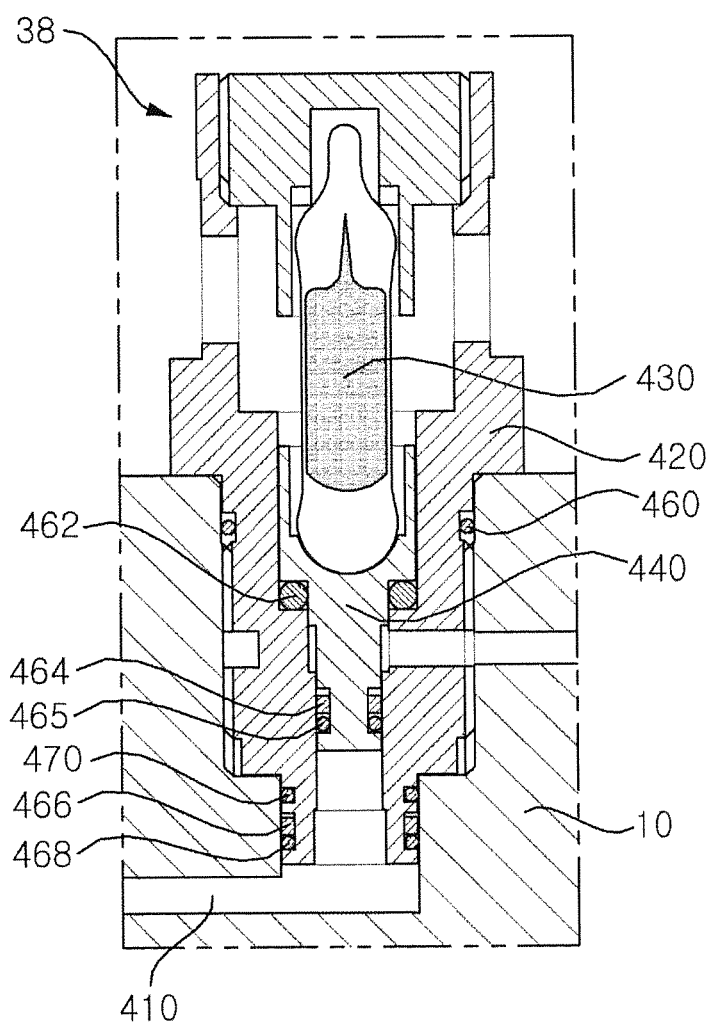
FIG. 19 is a cross-sectional view of a pressure relief device according to an embodiment of the present invention.
Figure 20:
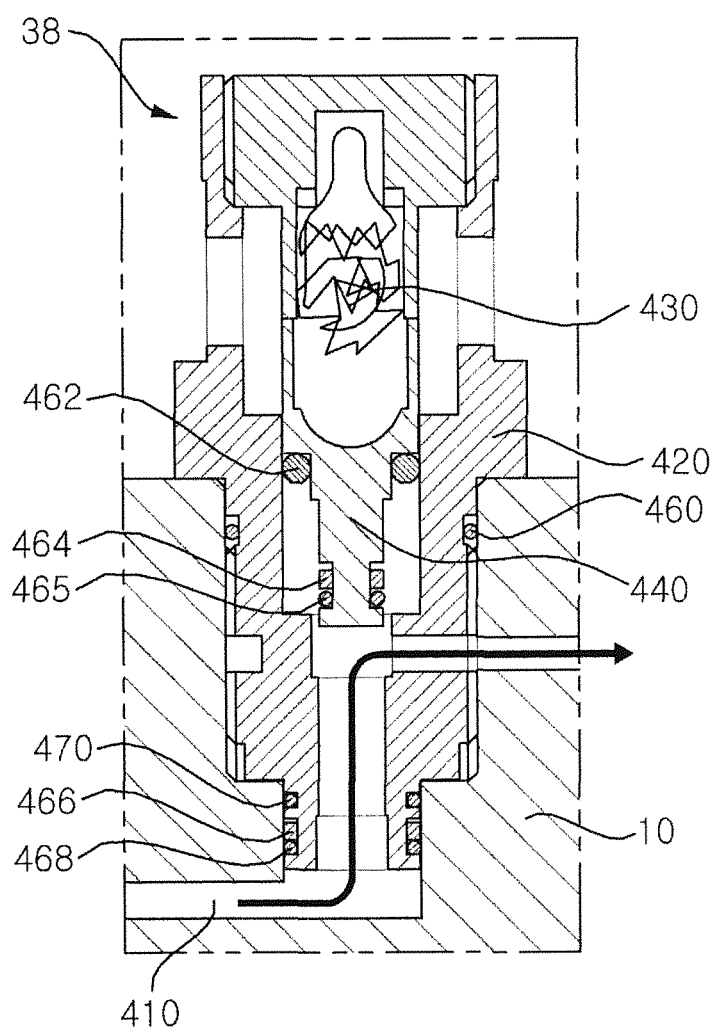
FIG. 20 is a cross-sectional view showing the operation of a pressure relief device according to an embodiment of the present invention.

FIG. 19 is a cross-sectional view of a pressure relief device according to an embodiment of the present invention. FIG. 20 is a cross-sectional view showing the operation of a pressure relief device according to an embodiment of the present invention.

A pressure relief device 38 is mounted on the main valve body 10 and mounted on a sixth flow passage 410 communicating with the high-pressure vessel 100, to thus play a role of releasing the pressure in the high-pressure vessel 100 to the outside if temperature of the high-pressure vessel 100 reaches a preset temperature or above. As an example, when a fluid control system according to this embodiment is applied to a hydrogen fuel cell vehicle, and a vehicle accident such as a fire occurs, the pressure in the high-pressure vessel 100 is discharged to the outside to thereby prevent the explosion of the high-pressure vessel 100.

The pressure relief device 38 includes: a valve body 420 that is mounted on the main valve body 10 and communicates with the sixth flow passage 410; a piston 440 that is disposed in the valve body 420 to be linearly movable; and a glass bulb 430 that is mounted in the inside of the valve body 440, and that is ruptured if the temperature of the glass bulb 430 reaches a set temperature or more, to thus linearly move the piston 440.

The glass bulb 430 is disposed in the interior of the valve body 420, and a cap member 450 for securing the glass bulb 430 is mounted at one end of the valve body 420.

The glass bulb 430 is ruptured depending on the temperature of the glass bulb 430, and the rupture temperature of the glass bulb 430 is 110±5□, in which the glass bulb 430 is not ruptured in the case that the pressure is increased but is ruptured in the case that the temperature is increased.

The valve body 420 is screwed on the main valve body 10, in which a first seal ring 460 is mounted on the outer circumferential surface of the valve body 420, and a second seal ring 470, aback-up ring 466, and a third seal ring 468 are sequentially mounted on the outer circumferential surface of the front side of the valve body 420, to thereby completely maintain airtight between the valve body 420 and the main valve body 10.

In addition, a fourth seal ring 462 is mounted between the piston 440 and the valve body 420, and a backup ring 464 and a fifth seal ring 465 are mounted on the outer circumferential surface of the front side of the piston 440, to thereby completely maintain airtight between the piston 440 and the valve body 420.

Looking at the operation of the pressure relief device 38 like this, when the temperature in the high-pressure vessel 100 is within a normal temperature scope, the piston 440 blocks the sixth flow passage 410 while being supported at the glass bulb 430, to thus prevent the source gas in the high-pressure vessel 100 from leaking from the high-pressure vessel 100. As shown in FIG. 20, if a vehicle accident such as a fire occurs, the temperature in the high-pressure vessel 100 is increased and becomes a set temperature or higher. As a result, the glass bulb 430 is ruptured, to thus retract the piston 440. Then, the sixth flow passage 410 is opened to thereby discharge the source gas in the high-pressure vessel 100 to the outside and prevent an accident such as an explosion of the high-pressure vessel 100.

Figure 21:
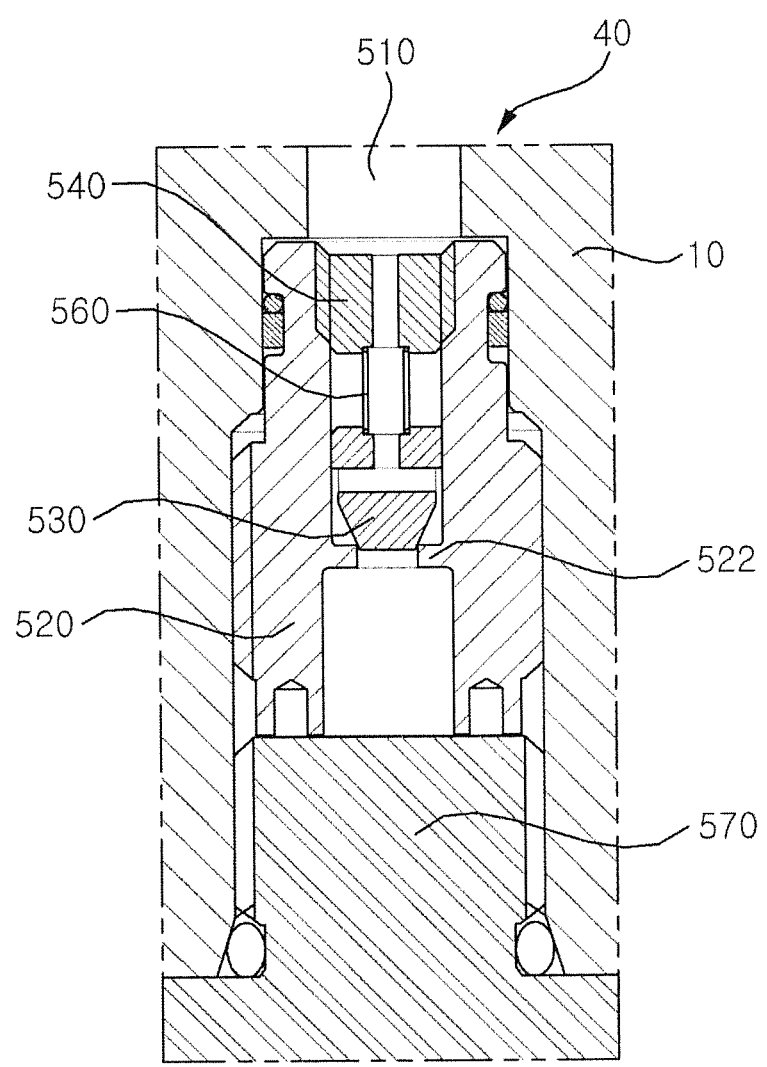
FIG. 21 is a cross-sectional view of a bleed valve according to an embodiment of the present invention.
Figure 22:
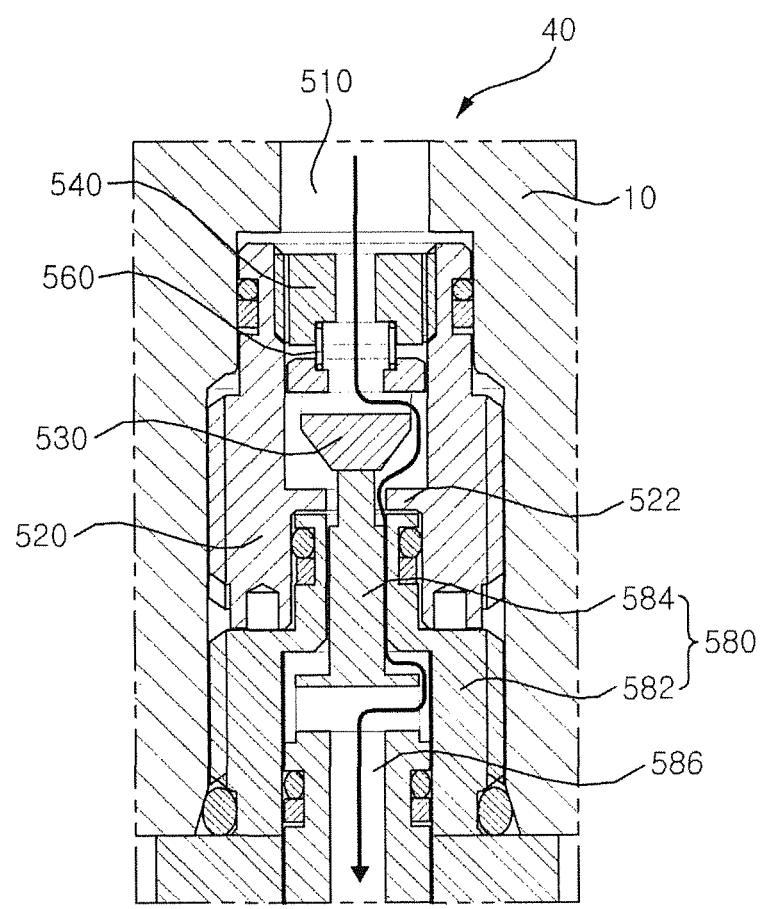
FIG. 22 is a cross-sectional view showing the operation of a bleed valve according to an embodiment of the present invention.

FIG. 21 is a cross-sectional view of a bleed valve according to an embodiment of the present invention. FIG. 22 is a cross-sectional view showing the operation of a bleed valve according to an embodiment of the present invention.

The bleed valve 40 is a valve that discharges the source gas in the high-pressure vessel 100 to the outside, optionally according to a user selective action, and includes: a valve body 520 that is mounted on a seventh flow passage 510 that is fixed to the main valve body 10 and connected to the high-pressure vessel 100; a valve member 530 that is disposed in the valve body 520 to be linearly movable and that is in close contact with a seat portion 522 that is formed in the valve body 520, to thus perform an opening and closing action; a nut member 540 that is fixed to the inner surface of the valve body 520; a spring 560 that is disposed between the nut member 540 and the valve member 530 to thus provide the valve member 530 with an elastic force; and a cap member 570 that is screwed to the seventh flow passage 510.

The bleed valve 40 blocks the seventh flow passage 510 since the valve member 530 is in close contact with the seat portion 522 of the valve body 520 by the pressing force of the spring 560.

Then, in the case that it is desired to release a source gas in the high-pressure vessel 100 in this state, the cap member 570 is separated from the seventh flow passage 510 as shown in FIG. 22. Then, a bleed tool 580 is pushed into the interior of the valve body 520, and thus the bleed tool 580 pushes the valve member 530. Accordingly, the valve member 530 is retracted to thereby open the seventh flow passage 510. Then, the source gas stored in the high-pressure vessel 100 is discharged in the arrow direction C via the seventh flow passage 510.

The bleed tool 580 includes: a tool body 582 that is screwed at a portion from which the cap member 570 is separated; and a tool member 584 that is disposed in the tool body 582 so as to be linearly movable, to thus push the valve member 530. Here, a passage 586 is formed on the tool member 584, and thus the source gas stored in the high-pressure vessel 100 is discharged to the outside through the passage 586.

The operation of the fluid control valve assembly according to an embodiment of the present invention that is configured as described above will follow.

Figure 23:
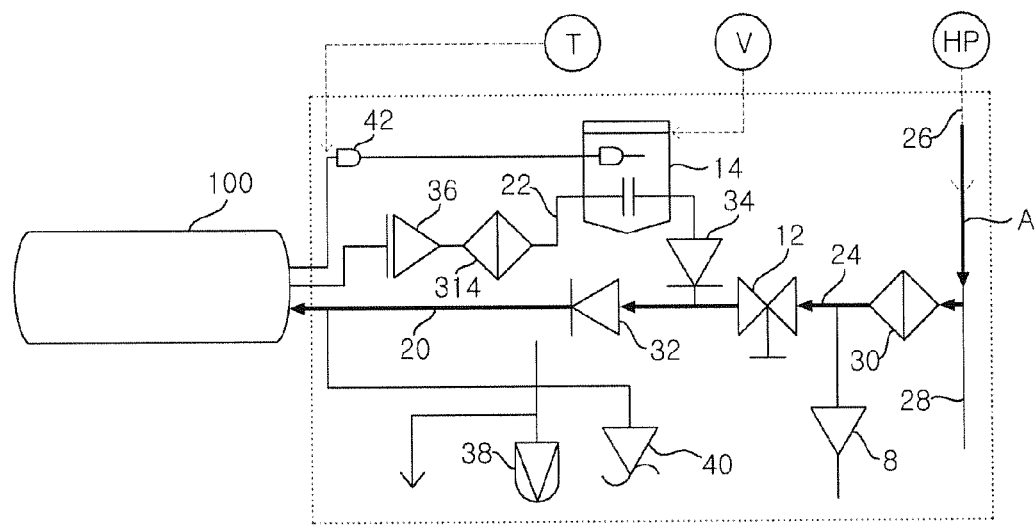
FIGS. 23 and 24 are block diagrams illustrating fluid flows of a fluid control valve assembly according to an embodiment of the present invention.
Figure 24:
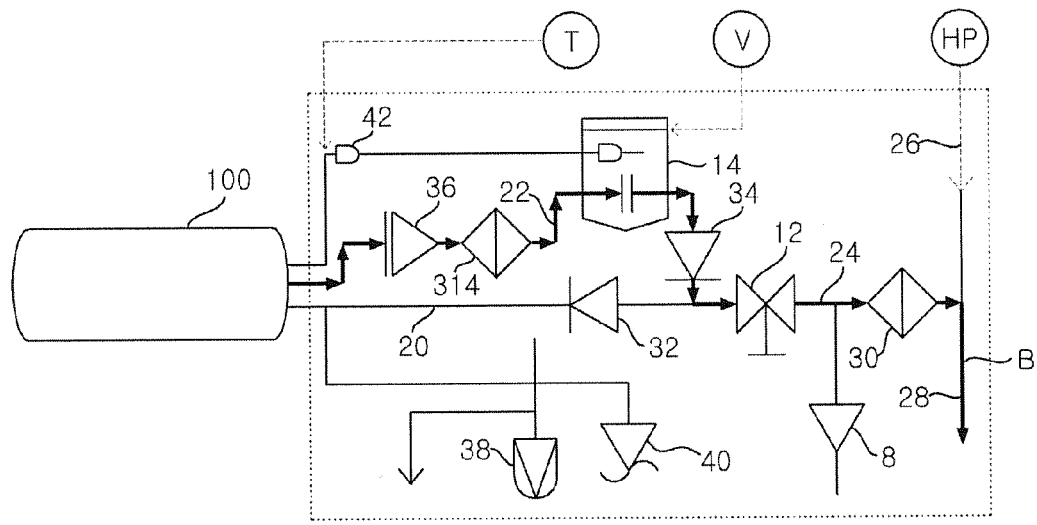

FIG. 23 is a block diagram illustrating fluid flows of a fluid control valve assembly during charging a gas according to an embodiment of the present invention. FIG. 24 is a block diagram illustrating fluid flows of a fluid control valve assembly during feeding a gas according to an embodiment of the present invention.

First, the flow of a source gas during charging the source gas will be described below.

As shown in FIG. 23, the charging source gas during charging the source gas flows in the arrow direction A, and the charging source gas discharged from a gas charging unit 300 is charged into a high-pressure vessel 100. In more detail, the charging source gas is introduced through the fourth flow passage 26 that is connected to the gas charging unit 300. Then, foreign matters are filtered when the charging source gas passes through a filter 30, and the gas charging unit 300 from which the foreign matters have been removed is introduced into the third flow passage 24. Here, the manual valve 12 that is mounted on the third flow passage 24 is operated at a state where the third flow passage 24 is opened, so that the charging source gas is introduced into the third flow passage 24. In addition, the charging source gas is introduced into the first flow passage 20 that is in communication with the third flow passage 24, and the charging source gas introduced into the first flow passage 20 passes through the first check valve 32 to then be charged into high-pressure vessel 100.

In this case, the second check valve 34 is blocked by the pressure of the charging source gas and the charging source gas is blocked from being introduced into the second flow passage 22. Accordingly, the charging source gas does not pass through the second flow passage 22, and thus it is possible to prevent the solenoid valve 14 mounted on the second flow passage 22 from malfunctioning or being out of control.

On the following, a flow of a source gas during feeding the source gas will be described below.

In the case that a source gas is fed for a gas consumer 400 such as a gas engine, the power is applied to the solenoid valve 14 according to an external electrical signal. Accordingly, the solenoid valve 14 is operated to thus open the second flow passage 22. Then, the source gas flows in the arrow direction B as shown in FIG. 24, and thus the source gas stored in the high-pressure vessel 100 is supplied to the gas consumer 400. More specifically, the source gas stored in the high-pressure vessel 100 flows into the second flow passage 22. Here, the feeding source gas is blocked from being introduced into the first flow passage 20 by the first check valve 32 mounted on the first flow passage 22.

Then, foreign matters are removed when the source gas introduced into the second flow passage 22 passes through the excess flow valve 36 and the filter 314. Here, if an overflow occurs, the excess flow valve 36 is operated to thus block a supply of the source gas.

Then, the feeding source gas passes through the solenoid valve 14 and the second check valve 34, to then be introduced into the third flow passage 24. In this case, the manual valve 12 mounted on the third flow passage 24 is operated at a state where the third flow passage 24 is opened. In addition, the feeding source gas introduced into the third flow passage 24 is secondarily purified while passing the filter 30, and then is supplied to the gas consumer 400 via the fifth flow passage 29.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

A valve assembly according to the present invention is mounted in a high-pressure vessel in which a source gas for a hydrogen fuel cell system is stored, and controls a flow of a source gas when the source gas is charged into the high-pressure vessel or when the source gas stored in the high-pressure vessel is fed for a gas consumer such as a gas engine, and prevents a damage to the valve and improves performance of the valve, by separately forming a charging flow passage that is used for charging the source gas into the high-pressure vessel and a feeding flow passage for feeding the source gas stored in the high-pressure vessel for a gas consumer such as a gas engine.

The invention claimed is:

1. A fluid control valve assembly comprising:
a main valve body having a first flow passage that is mounted on an inlet of a high-pressure vessel and through which a charging source gas passes, a second flow passage through which a feeding source gas passes, and a third flow passage to which the first flow passage and the second flow passage are connected;
a manual valve that is mounted on the main valve body and that opens and closes the third flow passage;
a solenoid valve that is mounted on the main valve body and that opens and closes the second flow passage by an electrical signal;
a first check valve that is provided on the first flow passage to thus block a reverse flow of the charging source gas; and
a second check valve that is provided on the second flow passage to thus block a reverse flow of the feeding source gas, and block the charging source gas from flowing in the second flow passage, to thereby prevent the charging source gas from flowing in the solenoid valve.

2. The fluid control valve assembly according to claim 1, wherein the first flow passage and the second flow passage are branched from one end of the third flow passage, and a fourth flow passage in which the charging source gas flows and a fifth flow passage through which the feeding source gas is discharged are connected to another end of the third flow passage.

3. The fluid control valve assembly according to claim 2, wherein a filter that filters fine dusts is provided at a portion where the fourth flow passage and the fifth flow passage meet, and a sintering filter is used as the filter.

4. The fluid control valve assembly according to claim 1, wherein a thermistor for measuring the temperature of the source gas stored in the high-pressure vessel is provided at one side of the main valve body.

5. The fluid control valve assembly according to claim 1, wherein the manual valve comprises a valve body that is coupled to the main valve body, and a valve member that is screwed into the inner surface of the valve body and that opens and closes the third flow passage by rotating the valve body, and a close contact portion that is in close contact with a seat portion formed in the third flow passage is integrally formed at the end of the valve member.

6. The fluid control valve assembly according to claim 1, wherein the solenoid valve comprises:
a valve body that is mounted on the main valve body;
a valve seat that is mounted on the lower portion of the valve body;
a coil that is mounted on an outer circumferential surface of the valve body and that is powered;
a core that is mounted on an inner surface of the valve body;
a lower plunger that is disposed movably on the inner surface of the valve body in which an orifice is formed, and on the bottom of which a close contact portion that is in close contact with a valve seat is integrally formed;
an upper plunger that is disposed linearly movably at an upper side of the lower plunger, activates in conjunction with the lower plunger, and with which a close contact portion that is in close contact with the orifice is integrally formed; and
a spring that is disposed between the upper plunger and the core and that presses the upper plunger to keep the valve closed.

7. The fluid control valve assembly according to claim 6, wherein a screw coupling portion is formed on the outer circumferential surface of the valve body, so as to be screwed on the main valve body, a first space portion on which the upper plunger is disposed and a second space portion whose inner diameter is formed larger than that of the first space portion and on which the lower plunger is disposed are formed in the inside of the valve body, and an inlet through which the source gas is introduced is formed on the lower circumferential surface of the valve body.

8. The fluid control valve assembly according to claim 6, wherein the lower plunger comprises:
a body portion that is arranged to be movable on the inner surface of the valve body;
a recess portion that is formed on the upper surface of the body portion and through which the source gas is introduced;
a close contact portion that is integrally formed on the lower surface of the body portion and that is in close contact with the valve seat; and an orifice that is formed on the bottom of the recess portion so as to pass through a central portion of the close contact portion and through which the source gas is introduced.

9. The fluid control valve assembly according to claim 8, wherein an end portion of the close contact portion is formed in a curved shape so as to be inserted into an outlet formed in the valve seat.

10. The fluid control valve assembly according to claim 8, wherein a seat portion with which the upper plunger is in close contact protrudes on the bottom of the recess portion.

11. The fluid control valve assembly according to claim 8, wherein the upper plunger comprises:
   a body portion that is in close contact with the inner surface of the valve body to be linearly moved;
   a connecting portion that is formed to include a locking protrusion that is formed on the bottom of the body portion, inserted into the recess portion of the lower plunger to then be linearly movable, and locked with a locking bar formed in the recess portion; and
   a close contact portion that is integrally formed on the lower surface of the connecting portion, and that seals the orifice.

12. The fluid control valve assembly according to claim 11, wherein the connecting portion is formed in a polygonal shape in cross-section and comprises first planar portions each having a large area and second planar portions that are formed between the first planar portions and each of which has a small area, and the locking protrusion protrudes from the bottom of each of the second planar portions.

13. The fluid control valve assembly according to claim 1, wherein the second check valve comprises:
   a seat member that is fixed to a mount recess formed in the second flow passage of the main valve body; and
   a valve member that is inserted in an inner surface of the mount recess so as to be linearly movable, and that is in close contact with the seat member to thus open and close the second flow passage, in which the valve member is in close contact with the seat member by pressure of the charging source gas.

14. The fluid control valve assembly according to claim 13, wherein a screw coupling portion is formed on an outer circumferential surface of the seat member, so as to be screwed in the inner surface of the mount recess, a first passage that is in communication with one side of the second flow passage is formed at a side surface of the seat member, and a second passage that is in communication with the first passage is formed at a lower surface of the seat member.

15. The fluid control valve assembly according to claim 13, wherein the valve member is inserted in the inner surface of the mount recess so as to be linearly movable, in which a close contact portion formed of a slope so as to be in close contact with a lower surface of the seat member is formed at one side of the valve member, a third passage through which the source gas passes is formed at a side surface of the valve member, and a fourth passage communicating with the third passage is formed at a lower surface of the valve member.

16. The fluid control valve assembly according to claim 1, further comprising an excess flow valve that is mounted in the main valve body and communicates with the second flow passage to thus block the second flow passage if an overflow occurs.

17. The fluid control valve assembly according to claim 16, wherein the excess flow valve comprises:
   a filter housing that is mounted on the main valve body in which a passage that is in communication with the second flow passage is formed at the center of the filter housing and a filter is mounted in the inner surface of the passage;
   a valve body that is mounted at one end of the filter housing in which another passage communicating with the passage is formed;
   a valve member that is arranged in an inner surface of the valve body to be linearly movable, and that is in close contact with one surface of the valve body to thus block the passage if an overflow occurs;
   a spring that is disposed between the valve member and the valve body and provides a pressing force to maintain an open position the valve member; and
   a valve nut that is mounted on one surface of the valve body to thus prevent the valve member from being separated from the valve body.

18. The fluid control valve assembly according to claim 17, wherein a sintering filter that is formed of a cylindrical shape is used as the filter.

19. The fluid control valve assembly according to claim 17, wherein the valve member is formed to have a passage that is formed in a square shape in cross section and through which a source gas is introduced, in which a close contact portion that is in close contact with the valve body to block the passage is formed at one surface of the valve member and an orifice through which the source gas passes is formed when the valve member is in close contact with the valve body.

20. The fluid control valve assembly according to claim 1, further comprising a pressure relief device that is mounted on the main valve body and connected to a sixth flow passage communicating with the high-pressure vessel, to thus release pressure in the high-pressure vessel to the outside if temperature of the high-pressure vessel reaches a preset temperature or above.

* * * * *